United States Patent
Cowan et al.

(10) Patent No.: US 7,437,717 B1
(45) Date of Patent: *Oct. 14, 2008

(54) TECHNIQUES FOR SOFTWARE CONFIGURATION TRACKING

(75) Inventors: Kenneth W. Cowan, Hollis, NH (US); Michael Strickman, Weston, MA (US)

(73) Assignee: Compuware Corporation, Detroit, MI (US)

( * ) Notice: Subject to any disclaimer, the term of this patent is extended or adjusted under 35 U.S.C. 154(b) by 546 days.

This patent is subject to a terminal disclaimer.

(21) Appl. No.: 10/754,017

(22) Filed: Jan. 7, 2004

Related U.S. Application Data

(63) Continuation of application No. 09/547,550, filed on Apr. 12, 2000, now abandoned.

(51) Int. Cl.
*G06F 9/44* (2006.01)
(52) U.S. Cl. ...................................... 717/131
(58) Field of Classification Search ................. 717/100, 717/105, 115–122, 127–137, 162; 707/1, 707/100, 101–102, 201–203
See application file for complete search history.

(56) References Cited

U.S. PATENT DOCUMENTS

| | | | | |
|---|---|---|---|---|
| 4,809,170 A | * | 2/1989 | Leblang et al. | 717/122 |
| 5,339,435 A | * | 8/1994 | Lubkin et al. | 717/121 |
| 5,574,898 A | * | 11/1996 | Leblang et al. | 707/1 |
| 5,850,554 A | * | 12/1998 | Carver | 717/162 |
| 5,950,209 A | * | 9/1999 | Carrier et al. | 707/203 |
| 6,167,406 A | * | 12/2000 | Hoskins et al. | 707/102 |
| 6,178,546 B1 | * | 1/2001 | McIntyre | 717/115 |
| 6,438,743 B1 | * | 8/2002 | Boehm et al. | 717/122 |
| 6,487,713 B1 | * | 11/2002 | Cohen et al. | 717/105 |
| 6,701,519 B1 | * | 3/2004 | Cowan | 717/130 |

\* cited by examiner

*Primary Examiner*—Tuan Anh Vu
(74) *Attorney, Agent, or Firm*—Muirhead and Saturnelli, LLC

(57) ABSTRACT

Techniques for gathering and tracking build information are described. Builds are registered initially. When a test execution is performed, a matching build is automatically determined from those previously registered builds as matching the software under test for a particular session. This information is tabulated in a database in accordance with additional software and hardware or platform information describes the environment in which a program executes. The platform information includes software component information and system configuration information uniquely identifying a particular instance of an environment. Data stored in the database is then analyzed and available for performing queries, for example, such as regarding code volatility and determining testing associated with a particular build.

24 Claims, 19 Drawing Sheets

TECHNIQUES FOR SOFTWARE CONFIGURATION TRACKING

CROSS REFERENCE TO RELATED APPLICATIONS

This application is a continuation of U.S. patent application Ser. No. 09/547,550 filed on Apr. 12, 2000 now abandoned.

BACKGROUND

1. Field of the Invention

This invention generally relates to software configuration tracking, and more particularly to techniques performed in a computer system for managing and tracking versions of software tested.

2. Description of Related Art

Generally, software testing is part of the software development process. Software testing may be performed, for example, to test a code modification that adds a new feature or corrects a reported problem. Software systems may rely on software components that are external to the software system, such as a software component provided as part of an operating system as well as various third-party provided software components. Various versions of the same software component may be tested as code is incrementally modified. Additionally, individual developers working on the same product may also modify portions of the same module.

One problem in software testing is tracking different versions or "builds" of a software system that are tested. Obtaining and tracking details of the various system builds may be manually tedious and error prone. Additionally, as more and more test runs are performed, as may be typical in product development, it becomes more difficult to track what version of a software system is associated with a particular test run.

The problem of tracking different software builds is further compounded by indirect dependencies between components. For example, the software system under development might rely on a component A which in turn relies on a component B which in turn also further relies on another component C. Thus, in tracking dependencies and information, the software system being tested is dependent upon a particular version of components A, B and C. The fact that the software system being tested has an indirect dependency upon the C component may not be obvious to developer of the software, for example, as it may be an indirect call to a library provided in an operating system. Thus, tracking software builds may be further complicated by these indirect dependencies.

One technique currently in use is to manually track data describing the various builds that are tested. However, as previously described, one of the drawbacks of this technique stems from the tediousness of tracking even the slightest change in software, and the possibility of a large number of builds as may be typical during software product development. The data gathering may be time consuming as well as error prone. Also, as previously pointed out, another drawback is that it may be difficult to identify all of the indirect dependencies, for example as the previously described software component C. Additionally, the problem may be further compounded in terms of complexity and environment in which shared components such as a shared library may be updated from one of a variety of software package installations. For example, two layered software products may use the same software library. When each of the two layered products are installed, a different version of the same library may be installed on the same computer system. It may be unclear to one using a routine in the library which version is being used. Thus, such installations using shared software components make it difficult and further compound the problem of tracking the various software components associated with a particular build.

Thus, there is required a technique which provides for automatically tracking the various software components of a particular build in accordance with a particular version of a software system being tested.

SUMMARY OF THE INVENTION

In accordance with principles of the invention is a method executed in a computer system and a computer program product for automatically tracking build information. One or more builds are registered by storing build information corresponding to each of said one or more builds. At runtime, software module information is automatically determined about a version of software being tested. A first of the one or more builds corresponding to the runtime software module information is automatically determined.

In accordance with another aspect of the invention is a method executed in a computer system and a computer program product for determining code volatility. At least two builds are registered by storing information corresponding to the at least two builds. A first and a second of the at least two builds are identified. Information is stored in a database regarding the first and second builds. Code volatility is determined using the information about the first and second builds. The code volatility is determined using one or more metrics representing an amount of code change that has occurred between the first and the second build.

In accordance with yet another aspect of the invention is a method executed in a computer system and a computer program product for tracking build information. One or more builds are registered by storing information in a database. Software that includes one or more modules is tested. A matching build for the one or more modules associated with one of the builds previously registered is automatically determined. Testing associated with a build is determined by performing a query using the information in the database.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT

Figure 1:
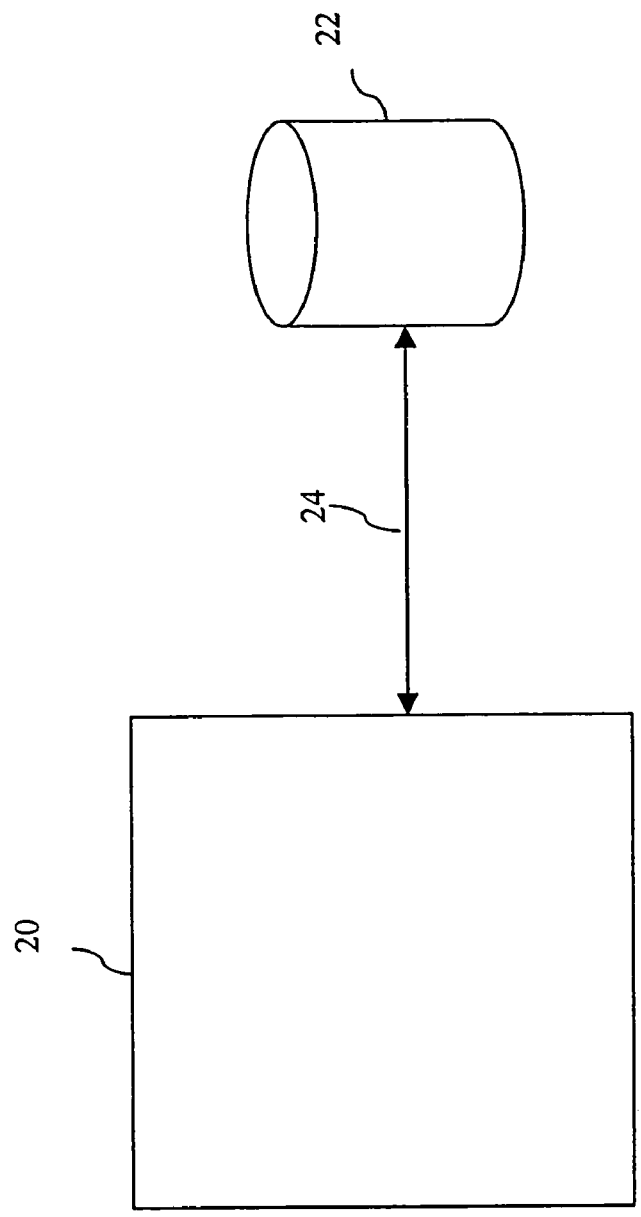
FIG. 1 is an example of an embodiment of a computer system.

Referring to FIG. 1, shown is an example of an embodiment of a computer system. The computer system 10 includes a computer processor 20 connected to a database 22 by communication means 24. In the computer system 10, the computer processor 20 may be any one of a variety of commercially available processors, such as an Intel-based processor. It should be noted that other computer processors may be used in an embodiment and neither the type nor number of processors should be construed as a limitation.

The computer processor 20 is connected by a communication means 24 to a data storage device 22. The data storage device 22, for example may be any one of a variety of data storage devices known to those skilled in the art. The data storage device 22 may include a database and comprise a varying number and type of storage devices ranging from, for example, a plurality of disks to a single "floppy" drive.

As known to those skilled in the art, both the processor and the data storage device may vary in accordance with each embodiment and implementation in terms of number and type of each. Similarly, the communication means 24 used to facilitate communications between the processor 20 and the data storage device 22 may be any one of a variety of communication devices, such as a network connection in accordance with each implementation and embodiment.

Figure 2:
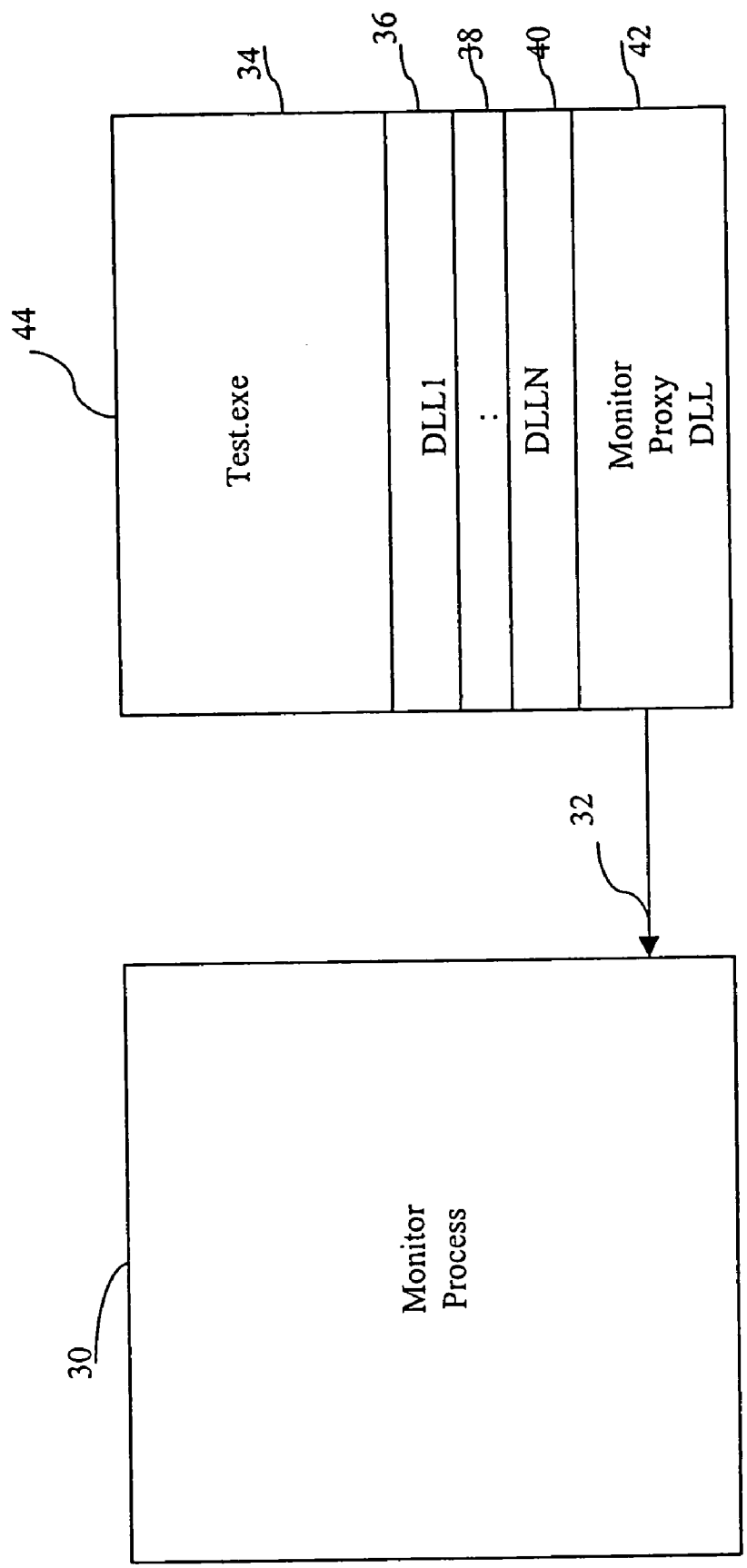
FIG. 2 is an example of an embodiment of a monitor process gathering information from a test program.
Figure 3:
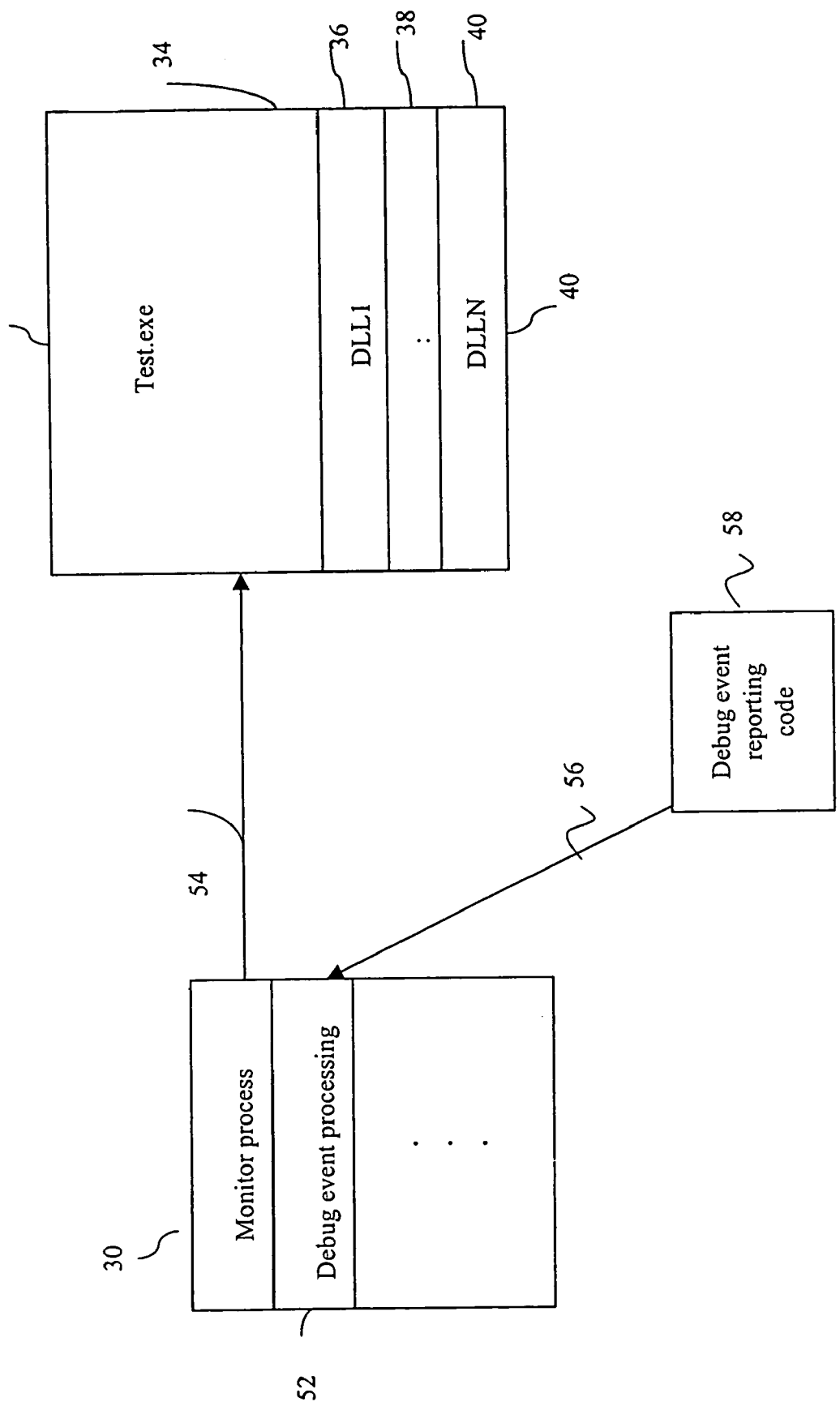
FIG. 3 is an example of another embodiment of a monitor process gathering information from a machine executable program.

What will now be described in conjunction with FIG. 2 and FIG. 3 are embodiments that may be used to gather a portion of platform data. Platform data generally includes system configuration information and software data that describe's a software runtime environment. The software data includes software component information distinguishing one version of a software component from another. The system configuration data may include, for example, different software settings or options and hardware data particular to a system environment. The hardware data may include, for example, hardware configuration data distinguishing the system upon which a program is executed. Taken together, the system configuration data and software data describe a "platform" as may describe the environment in which a program is executed.

Referring now to FIG. 2, shown is an example of an embodiment of software that may execute in the computer system 10. FIG. 2 includes a monitor process 30 and a program being monitored 44. Both the monitor process 30 and the machine executable program being monitored (test.exe 44) may be executed by the computer processor 20 and stored on the data storage device 22. The machine executable code associated with the monitor process 30 and the program being tested 44, for example, may be stored on the data storage device 22 in the computer system 10 and loaded for execution via communication means 24 to the computer processor 20.

The monitor process 30 may be a machine executable program written in any one of a variety of commercially available programming languages, such as C++. An example of a monitor process is included in the commercially available implementation of NuMega BoundsChecker. Generally, the monitor process 30 gathers information and data in accordance with the execution of the program under test 44 which in this example may be referred to as test.exe. The machine executable program 44 being monitored in this particular example may be written in one of a variety of conventional, commercially available languages, such as C, and C++, for which instrumentation may be provided. One technique of how instrumentation of a program may be performed is described in U.S. patent application Ser. No. 08/916,125, entitled "IR Code Instrumentation", now issued as U.S. Pat. No. 5,987,249.

The illustration in FIG. 2 of the program being monitored, test.exe 44, includes several portions. The portion 34 corresponds to a segment of user supplied source code. Also included in the program 44 are several dynamic link libraries (DLLs). Each of the DLLs, for example such as DLL1 36 and monitor proxy DLL 42, correspond to shared machine executable code which resides in the computer system 10 as a library of routines which may be used, for example, by the user supplied portion 34. Additionally, a DLL, such as DLLN 40, may be included due to an indirect call from within another DLL, such as DLL1 36. This may occur, for example, if a call is made by DLL1 36 to an operating system or other routine which is included in another DLL. As previously described, a call may also be made to a DLL directly from the user portion 34.

It should be noted that the monitor proxy DLL 42 may be included automatically at link time into the machine executable 44 in this particular embodiment as a result of code instrumentation. Alternatively, other embodiments may employ other techniques to cause DLL 42 to be loaded into process execution space, for example, as described in "Programming Applications for Microsoft Windows", 4th Edition, by J. Richter, Microsoft Press, September 1999. In this particular embodiment, the monitor proxy DLL 42 is included in the commercially available product NuMega TrueTime in conjunction with the monitor process 30, for example, using the techniques set forth in U.S. patent application Ser. No. 08/916,125, entitled "IR Code Instrumentation". Generally, the monitor proxy DLL 42 includes monitoring routines which report information back to the monitor process 30. In this particular embodiment, the monitor proxy DLL 42 includes code that monitors events related to the loading of various types of libraries. For example, the libraries monitored by routines in the monitor proxy DLL 42 include shared libraries or DLLs as well as OCX or ActiveX Control libraries. Generally, as known to those skilled in the art, DLLs and OCXs include shareable machine executable code that may be used for example by program 44. The proxy monitor DLL 42 includes routines that send load event information to the monitor program 30 using connection 32.

In this embodiment, the monitor proxy DLL 42 may receive DLL load information by scanning the process virtual address space, or, by monitoring calls to operating system routines that load the DLLs, such as the LoadLibrary routine from Microsoft Windows. Information may be transferred to the monitor 30 using shared memory as the communication channel 32. It should be noted that other embodiments may employ other techniques in accordance with each implementation.

The library load information communicated from the monitor proxy DLL 42 to the monitor process 30 may be achieved, for example, in a Windows programming environment, such as using Windows 95 or Windows NT. In this environment, programming applications may be invoked from a menu option. For example, using a "start" option selected from a menu display, the machine executable program 44 may be selected to begin execution. Once the program 44 to be tested or monitored is executed, the monitor process 30 is invoked indirectly from code included in the monitor proxy DLL. The monitor process 30 is invoked indirectly because previously the machine executable program 44 was linked for instrumentation and monitoring.

The monitor proxy DLL 42 monitors operating system events for loading machine executable code or libraries such as DLL1 36 and DLLN 40. The monitor proxy DLL 42 includes code to accomplish this, for example, by monitoring user API calls made within the user supplied portion 34. For example, the monitor proxy DLL may monitor specific user APIs such as CoCreateInstance and Load Library which are APIs used in the Windows environment for loading DLLs. It should be noted that other embodiments may include monitoring of other particular APIs from within user code 34. Additionally, other techniques may be used to gather information regarding software components used with a program being tested 44.

It should be noted that the foregoing description regarding FIG. 2 refers to one technique by which data regarding software components used by a particular program being tested may be communicated to a monitor process for gathering of software component information whose use will be described in the following paragraphs.

Referring to FIG. 3, shown is an example of another embodiment by which information may be gathered regarding particular operating system events as needed for loading different software components or libraries. In FIG. 3, shown is the monitor process 30 a machine executable program to be tested 50 and debug event reporting code 58. The debug event reporting code 58 may be a portion of operating system code that is invoked when a particular system event occurs. In this particular embodiment, the program being tested 50 does not include a monitor proxy DLL 42 as previously shown in the embodiment of FIG. 2. Additionally, it should be noted that the program 50 may also be written in any one of a variety of commercially available programming languages, such as C or C++.

In this particular embodiment, the debug event reporting code 58 forwards information regarding operating system events for loading different libraries such as DLL 1 36 to a portion of code referred to as debug event processing code 52 included in the monitor process 30.

The alternate embodiment as depicted in FIG. 3 may occur, for example, by invoking the monitor process directly from the "start" program menu as in a Windows-95 or other similar programming environment. Subsequently, from within the monitor process 30, a command or graphical user interface may be displayed and the user may enter commands to invoke the machine executable program to be tested 50.

When program 50 is executed, the debug event reporting code 58 monitors or "catches" certain operating system events, such as the loading of libraries such as DLL1 36. In this embodiment, the operating system includes code for loading the library, such as DLL1. The operating system also includes the code associated with the debug event reporting code 58. Thus, in this embodiment, the operating system transfers control from the load library routine to the debug event reporting code 58, for example, upon loading a DLL. Subsequently, when a DLL load event occurs, the debug event reporting code 58 is executed and reports the occurrences of the load event to the debug event processing code 52 of the monitor process 30. In one particular embodiment, the debug event processing code 52 includes a code loop which continuously monitors events from the WIN32 API as reported by the debug event reporting code 58.

In one embodiment, the communication channel between the debug event reporting code 58 and the debug event processing code 52 may be established by having monitor process 30 identified or associated with the program 50 as a debugger process, such as by using operating system routines. Other embodiments may employ other techniques in accordance with each implementation.

It should be noted that the embodiments previously described with regard to FIGS. 2 and 3 are two of a variety of different techniques that may be used to gather various software component information. In this particular embodiment the software components for which information is being gathered are libraries, such as DLLs or OCXs as known in the Windows environments. Other types of programming environments may include different types of software components other than a library such as a DLL or OCX.

The types of software components that may be used in connection with testing a software program may vary with programming environment. However, generally a software component is a unit of software that may be used with a machine executable program, such as 50 of FIG. 3 and 44 of FIG. 2. In other words, each of the software components are units that may be varied within a machine executable program to be tested. Using these monitoring techniques, data regarding the different software components is gathered.

In the previously described embodiment of FIG. 2, the monitor proxy DLL 42 is included as a portion of the program being tested 44 to monitor for specific calls and communicate information to the monitor process 30 when a particular software component is loaded. This DLL 42 is automatically included in the linked program 44 as a result of instrumentation of the program. In this embodiment, for example, DLL 42 may be included in a commercially available product such as NuMega TrueTime. The technique of FIG. 2 may be used with a program that uses code instrumentation. For example, the program 44 may be an instrumented machine executable program produced using C source code.

In contrast, the embodiment in FIG. 3 uses debug event reporting code 58, such as operating system code invoked for debug event processing, that forwards data to the monitor process when a particular software component is loaded. No instrumentation is used and no monitor proxy DLL 42 is included in the resulting program being tested 50.

Using either technique in FIG. 2 or FIG. 3, information regarding the software component used is communicated to the monitor process 30. Generally, the information which is recorded for the particular library or software component is distinguishing information enabling one to identify a particular version of the software component or library. This information may include, for example a version number, a link date and time, a file size, as well as other information which may be used to distinguish one version of the software component from another.

What has been described generally is the gathering of information with regard to software components executed at runtime. In the previously described embodiments, the software components included libraries such as DLLs or OCXs. The information which is gathered with regard to each of the libraries is distinguishing or identifying information to enable one particular version of a software component to be distinguished from another version of the software component.

What will now be described is how this information may be stored and used within the system 10, as well as a particular embodiment of the information in accordance with a database schema.

Figure 4:
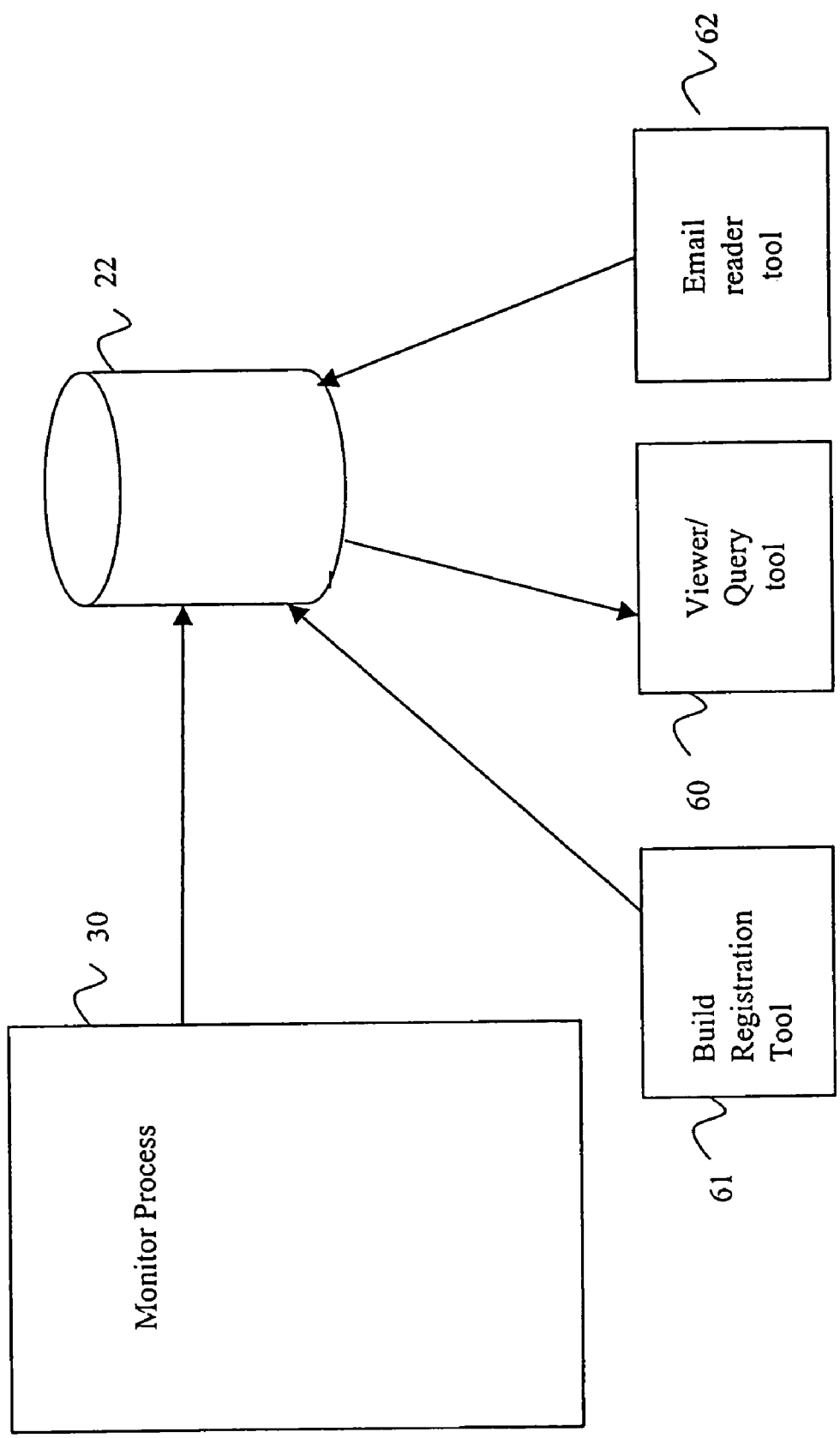
FIG. 4 is an example of an embodiment of a monitor process interacting with a database and other tools using information stored to the database.

Referring to FIG. 4, shown is a data flow diagram of one embodiment of the data flow relationship between the monitor process and various tools using software component information. The monitor process 30, the build registration tool 61, and the e-mail reader tool 62 in this particular embodiment store the information gathered regarding the libraries on the storage device 22. This information may be used by various tools such as a viewer/query tool 60.

It should be noted that other embodiments may include other tools using the information in device 22. Additionally, other information besides the software component and other platform data may reside on the storage device 22.

Generally, platform data includes the software component information gathered by the monitor process. The platform data is stored in the data storage device 22 in any one of a variety of data organizations and formats that may be understood and accessed by the various tools, such as the viewer/query tool 60 and the e-mail tool 62. In one embodiment, the viewer/query tool 60 accesses platform information and, via a user interface, displays the information in a user-readable form.

The e-mail reader tool 62 may be connected to an outside network and is forwarded formatted e-mail messages, for example, from a customer site reporting a problem. The formatted e-mail message may describe the platform upon which the problem occurs. The e-mail reader may interpret this formatted e-mail message and enter associated platform data in the database for the bug report.

It should be noted that the formatted e-mail message may be in any one of a variety of fixed formats. For example, in one embodiment, the e-mail message includes one or more pairs of data. Each pair includes a field-name and one or more corresponding data fields. The field-name is recognized as a keyword by the e-mail reader tool and the keyword and corresponding data map to fields and corresponding data values as may be used in a database organization. For example, a field-name, may refer to a particular type of database object having one or more associated fields. The corresponding data may identify a particular field of the object and a value for an instance of that field. Other embodiments may have other types of formatted input that the tool understands and subsequently maps to a corresponding database item.

In one embodiment, the e-mail reader tool 62 enters build data associated with a bug report. Build data may generally refer to that software information describing a particular version of a software product, such as identifying information of the various libraries or DLLs. In this instance, the build data reported in the formatted e-mail message describes the software version(s) associated with the bug being reported. Upon receipt of a bug report, the e-mail reader tool 62 may determine which build in the database 22 corresponds to the version of the software product described in the bug report. One technique for determining or identifying a matching build, as may be included in the e-mail reader tool, is described in more detail in paragraphs that follow.

Tools, such as the viewer query tool 60, the build registration tool 61, and mail reader tool 62 may be bundled with the commercially available monitor process 30. Alternatively, each of the software tools may also be additional third party products that interact with data in a particular format for example as will be described in a particular database format. It should also be noted that other tools and other functions in accordance to the particular embodiment may exist and interact with the data storage device 22 making use of software component information as gathered by the monitor process 30.

In one embodiment, the platform data on the data storage device 22 is stored in a particular database format known as an object-oriented database, such as that used with the commercially available object-oriented database "Poet", by Poet Software. In this particular implementation, the data which is gathered by the monitor process 30 is stored in an object database in which the data is represented in the form of objects that are connected or associated with one another. The data is stored on the storage device 22 and the various tools such as the viewer/query tool 60 and the e-mail reader tool 62 interact with this commercially available database, for example, using a query language and interface provided with the commercially available database product. For example, APIs as provided by the commercially available object database software may be used to formulate a query and obtain data resulting from a query.

Figure 5:
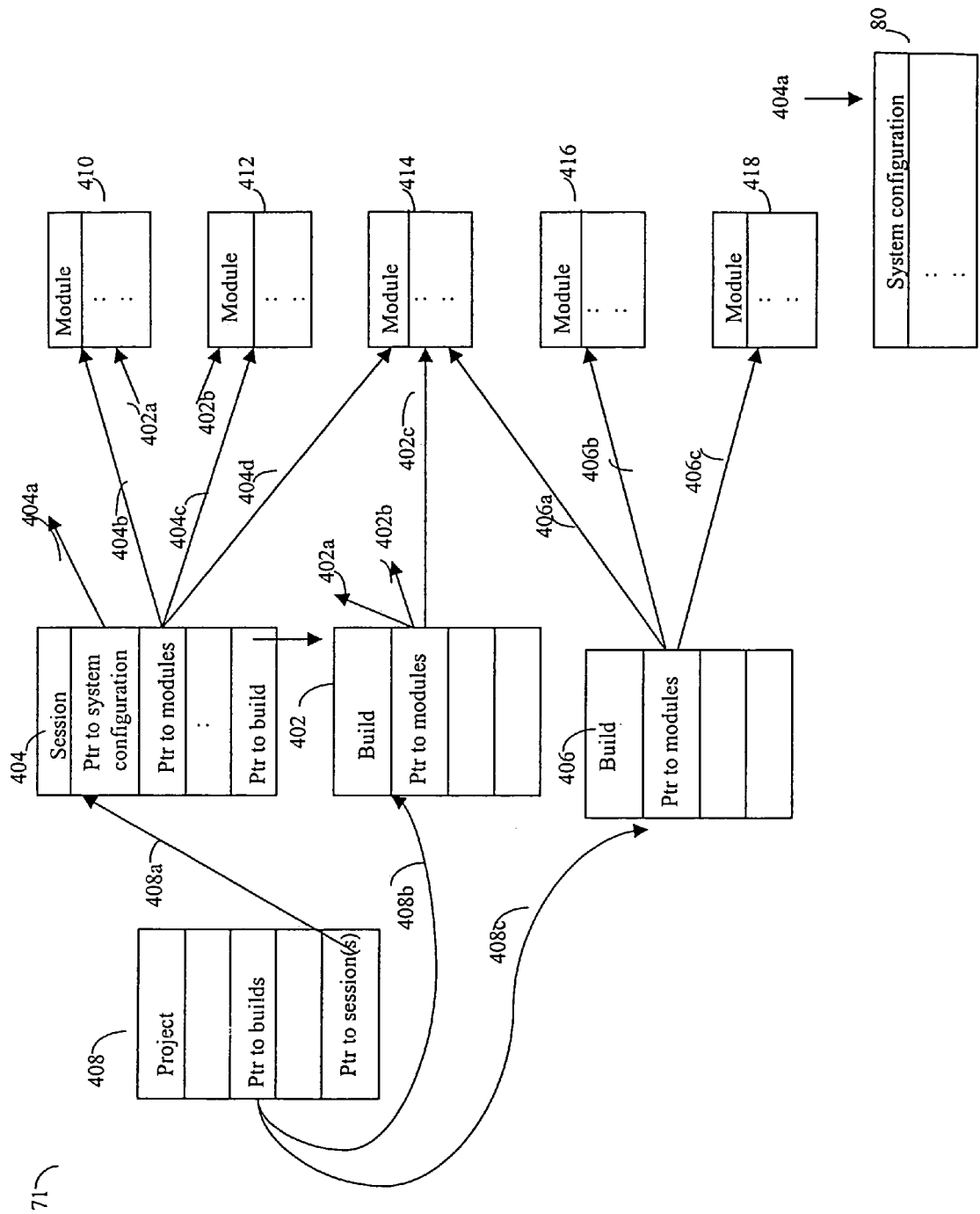
FIG. 5 is an example of an embodiment of a data representation of information stored in the database of FIG. 4.

Referring to FIG. 5, shown is an example of a representation of a database schema 71 describing a database organization. In accordance with the representation 71, the various types of software component information as gathered by the monitor process 30 may be stored on the device 22. Additionally, build data, such as that which may be gathered using the build registration tool 61, may also be included in the database schema 71 and an example is included herein. It should be noted that although what will be described is stored in a particular type of database and a particular representation of the data, other embodiments may use other types of databases and other representations for storing the platform data gathered by the monitor process 30, and the build data gathered by the build registration tool. Included in the representation of the database schema is a project object 408, a session objects 404, build objects 402 and 406, module objects 410, 412, 414, 416, and 418, and system configuration object 80. Relationships stored in the database between these various objects are represented by the arrows, for example, such as 404a, 404b and 404c. It should be noted that in this embodiment, each of the pointers are double pointers providing for an additional back-link between the objects identified in the database schema.

In this particular instance shown in FIG. 5, a project object 408 points to a particular session object 404 and build objects 402 and 406. Generally, the project object represents information about a particular software project, for example, a particular software product under development. The session object 404 generally describes a particular test run or execution, and corresponding software being executed. The various fields represented within the session object 404 identify different hardware and software data and settings particular to the session instance being tested or identified by the object 404. Generally, a platform is referred to as various combinations of hardware and software data and settings. In this particular description, platform data includes software component information such as may be communicated by the monitor process 30, build registration information such as may be communicated by the build registration tool 61, as well as system configuration information 80. All of this information such as the software component information, build information, and the system configuration information is described in more paragraphs that follow. The build object, such as 402 and 406, identify a particular build of a software product. For example, when a development project performs a build of a product, various software libraries may be included. A particular build may include 3 libraries that have no modifications and are thus not recompiled or relinked. This build may also include a fourth library that includes functions with source code modifications with respect to the last time a version of this library was produced. Thus, this build requires a new version of the fourth library that is recompiled and relinked. The build object identifies four module objects corresponding to the foregoing four libraries and each of their associated information.

It should be noted that other embodiments may include variations of the foregoing example of the database schema 71. Software tested in a test session may include modules not associated with a build. Thus, in the database schema representation, a corresponding session object may be associated with modules objects not included or associated with a build object. In this example, modules not associated with a build but included in a test session may be, for example, system libraries, such as the COMCTL32.DLL. Modules associated with a build may also include libraries such as those conditionally loaded in response to certain events or activities being tested in a session. For example, a library or DLL for looking up words in a thesaurus may be loaded only in response to a menu selection. If a testing session only tested spell checking, this DLL would not be loaded and, thus, the module object for this DLL would not be included in the schema representation associated with a session object.

Generally, the objects and the relationships between the objects as stored in accordance with the model 71 are dictated by the various types of operations and queries to be performed upon the data stored in the device 22 as gathered by the monitor process 30, and other tools, such as build registration tool 61, and e-mail reader tool. In this particular embodiment, each of the module objects such as 410, 412, and 414 identify software component specific information. For example, in the database representation 71, a module corresponds to a particular library, such as a DLL. Recorded within each of the module objects such as 410 is software component information which uniquely identifies a particular version of a DLL for example. Similarly, the system configuration object 80 identifies various hardware configuration items and software environment conditions that may be referred to as system configuration items that were tested with regard to a particular session or test execution 404.

From the representation in FIG. 5, different software and hardware information may be obtained. For example, it may be determined what builds are associated with a particular project. The modules, as well as other build data, such as amount and type of testing performed, included in a particular build may be obtained. Information regarding what build is tested in a particular session may be obtained. Additionally, the database may be queried with regard to differences between two particular builds, such as regarding the amount of code change. The foregoing are a few examples of how this information stored in the database and will be explained in more detail in following paragraphs. Generally, in this embodiment, there are double pointers between each pair of objects for which there is a pointer indicated on the schema 71, such as between project and session objects, system configuration and session objects, modules and session objects, and build and module objects, and the like. However, for clarity in the Figure, only a single pointer for each is shown.

It should be noted that although FIG. 5 shows only a single session, in the database stored on the device 22 a plurality of sessions may be stored in which multiple sessions may point to the same instance of a module object. In turn, that single module object may have multiple arrows such from the module to the various sessions which utilize that particular software component. It should be noted that the same relationships may exist between one or more session objects and a system configuration object included in the representation 71.

Generally, although the representation 71 of FIG. 5 includes only a particular number of various types of objects, it should be noted that this is a "snapshot" of one state of the database. Other embodiments may have a varying number of objects and associations, for example, in accordance with the number of modules, and the like represented in the database.

Figure 6:
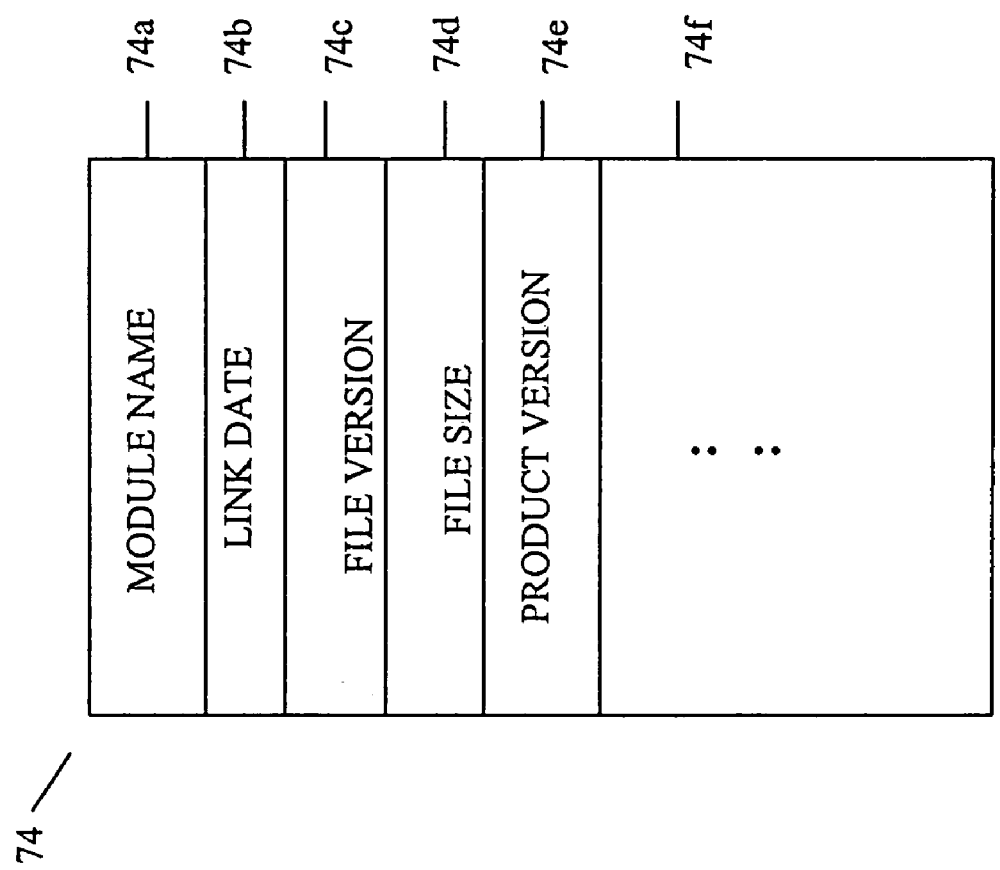
FIG. 6 is an example of the module object as included in the database schema.

Referring to FIG. 6, shown is an example of an embodiment of the module object 74. It should be noted that although what is shown are the details of only a single module object 74, these field that will be described may also be included in other modules objects, such as 410, 42, and the like, included in the representation 71. In this particular embodiment, the module object includes information which identifies uniquely a particular version of a shared library. Included in module object 74 is a module name 74*a*, a link date 74*b*, a file version 74*c*, a file size 74*d*, a product version 74*e*, and additional fields denoted by 74*f*. In this particular instance, a module name 74*a* may be an alpha-numeric or other representation identifying the software component. Additionally, the link date 74*b* may includes a date format record indicating, for example, the month, day, year, and time in terms of hours, minutes and seconds, of a particular linking of the module. In file version field 74*c*, a string, for example, may be stored as "4.3", identifying a particular release of a module. The file size is indicated in field 74*d*. This may be, for example, a numeric quantity representing the size of the module in bytes. The product version field 74*e* may also be a string that similarly identifies a version of an associated product, for example, that includes or uses the module identified by the object. Additional information may be stored also in this module record as indicated by 74*f*, for example, such as pointer to one or more session objects that include this module. This additional information may include data related to one or more functions included in the module being represented. This routine information may include function signature and checksum information used in determining differences at the function level.

In one embodiment, the additional information included in 74*f* is function data. The function data may be represented in a two-column table format or data pair in which the first item is a function name and the second column or item of the pair is a checksum of the machine code associated with the named function. As known to those skilled in the art, the checksum may serve as a function identity of this particular version of the function. The checksum may be represented as a numeric quantity determined in accordance with the machine code of the function. As will be described in paragraphs that follow, this checksum may be used to determine when a function has changed.

Figure 7:
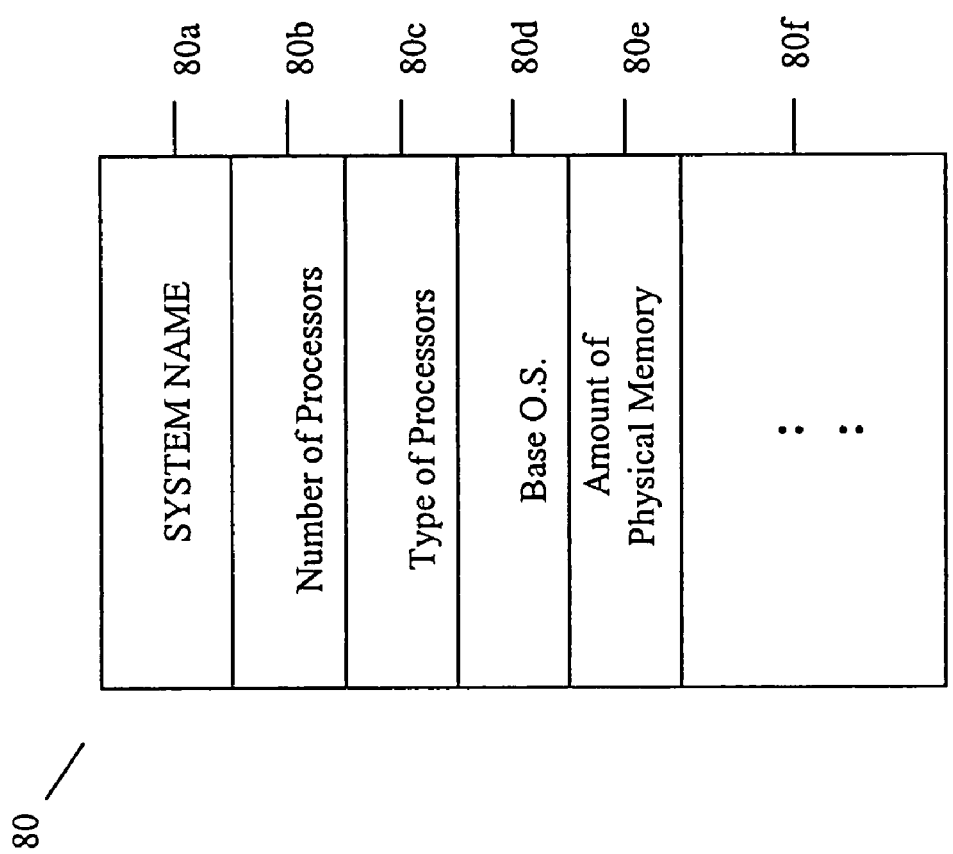
FIG. 7 is an example of an embodiment of the system configuration information object that may be included in the representation of a database schema.

Referring now to FIG. 7, shown is an example of an embodiment of the system configuration object 80, such as may be included in the description 71 of FIG. 5. In this particular embodiment, the system configuration object includes fields which identify and describe a particular system environment, for example, including hardware configuration information as well as various software environment settings defining a particular platform. The representation 80 includes fields system name 80a, number of processors 80b, type of processors 80c, base operating system 80d, amount of physical memory 80e, and other system configuration information fields indicated by 80f. For example, a system name is indicated field 80a which may indicate a particular alphanumeric name identifying a processor or node within a network upon which various test execution runs may occur. Also indicated in the number of processors field 80b may be a numeric quantity representing the number of processors that are in the system corresponding to system name and field 80a. Field 80c may indicate the type of each processor that occurs in the system name identified by 80a. Field 80d may be a base operating system indicator of a particular type and/or version number of an operating system. Field 80e may be a numeric quantity representing the amount of physical memory available in system 80a. It should also be noted that additional information may be included in accordance with each particular embodiment as indicated by 80f of FIG. 7. This information may include, for example, display resolution, indicator as to the number of colors (i.e., 256, 65536, 24-bit color, and the like), number of monitors, country information, language information, indicators as to whether various hardware and system support is available or set regarding, for example, double byte character set or whether Middle Eastern support (i.e., support for Hebrew and Arabic) is enabled, number of mouse buttons. Additionally, there may be pointer information, such as an indicator as to the associated one or more sessions.

Figure 8A:
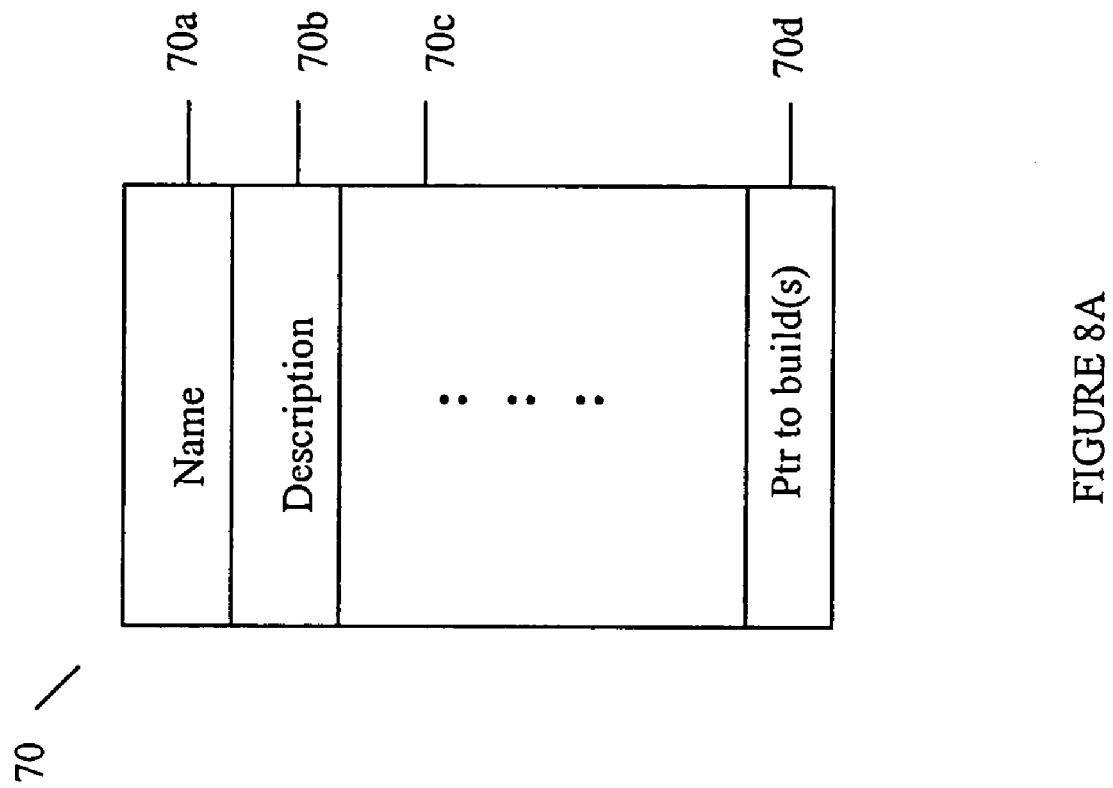
FIG. 8A is an example of an embodiment of the project object that may be included in the representation of the database schema.

Referring to FIG. 8A, shown is an example of an embodiment of a project object 70, such as may be the representation of the project object 408 included in FIG. 5. This embodiment of the project object 70 includes a name field 70a, a description field 70b, other fields indicated by 70c, and a pointer to a build object 70d. The name field 70a may be a string or other identifier associated with a project name. The description field 70b may be an alphanumeric description of the project. The other fields indicated by 70c may include, for example, pointer information to other objects such as a pointer to the session object 404 as indicated by 408a of FIG. 5. The field 70d is a pointer or a list of pointers to one or more build objects associated with this particular project, such as indicated by arrows 408a and 408b of FIG. 5. This field 70d may be filled in, for example, when a build is created and registered using the build registration tool.

Figure 8B:
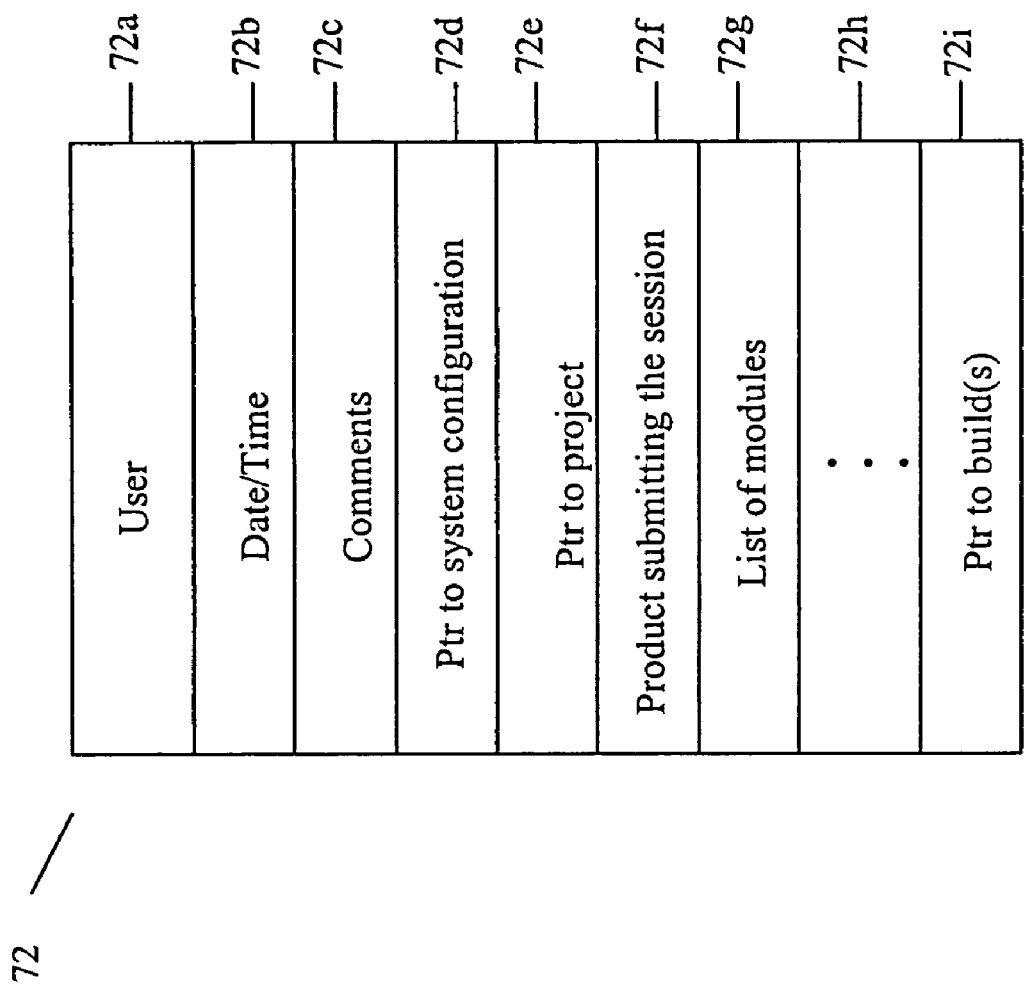
FIG. 8B is an example of an embodiment of the session object that may be included in the representation of the database schema.

Referring to FIG. 8B, shown is an example of an embodiment of a session object. The session object 72 in this example includes a user field 72a, a date/time field 72b, a comment field 72c, a pointer to the system configuration 72d, a pointer to the project 72e, an identifier as to the product submitting the session 72f, a list of components included in this session 72g, a pointer or list of pointers to one or more builds 72i, and other information as indicated by field 72h. The user field 72a identifies a particular user-identifier, such as a login identifier of a user. This may be represented, for example, as an alphanumeric string. The date/time field 72b is a date/time stamp information as to when the session occurred. This may be stored, for example, as an alpha-numeric string. The comments 72c may be a text field describing the particular session, for example, "test run for bug correction number nnn". Field 72d is a pointer to the associated system configuration object, such as indicated by arrow 404a of FIG. 5. Field 72e is a pointer to the project object. Field 72f is an indicator as to the product submitting the session. In this embodiment, this field indicates which monitor product in the commercially available product suite, such as NuMega DevPartner Studio, the identified user 72a was running. Field 72g is a list of modules associated with this session. For example, this list of associated modules may be represented as arrows 404a, 404b, 404c and 404d of FIG. 5. Field 72i identifies one or more builds associated with this particular testing session. Field 72h may include other information related to the session being represented in a particular embodiment. It should be noted that in field 72i, the build information may be filled in, for example, when software is tested. When a test system execution is performed, at runtime, information regarding the software modules being tested may be obtained automatically, for example, using techniques previously described. Once a set of modules has been determined, for example, as gathered using the techniques associated with FIGS. 2 and 3, the monitor process may also include machine executable code for determining a matching build that was previously registered. Prior to running a test system, one or more builds may be entered and registered using, for example, the build registration tool. This information may be included in the database. When the test system is executed, runtime information about software modules being tested may be gathered, for example, using the monitor process 30. The monitor process may also include code for interrogating or querying the database 22 to determine a matching build corresponding to the software module information gathered using the runtime techniques previously described herein. One such technique for determining a matching build is described in more detail in paragraphs that follow.

Figure 8C:
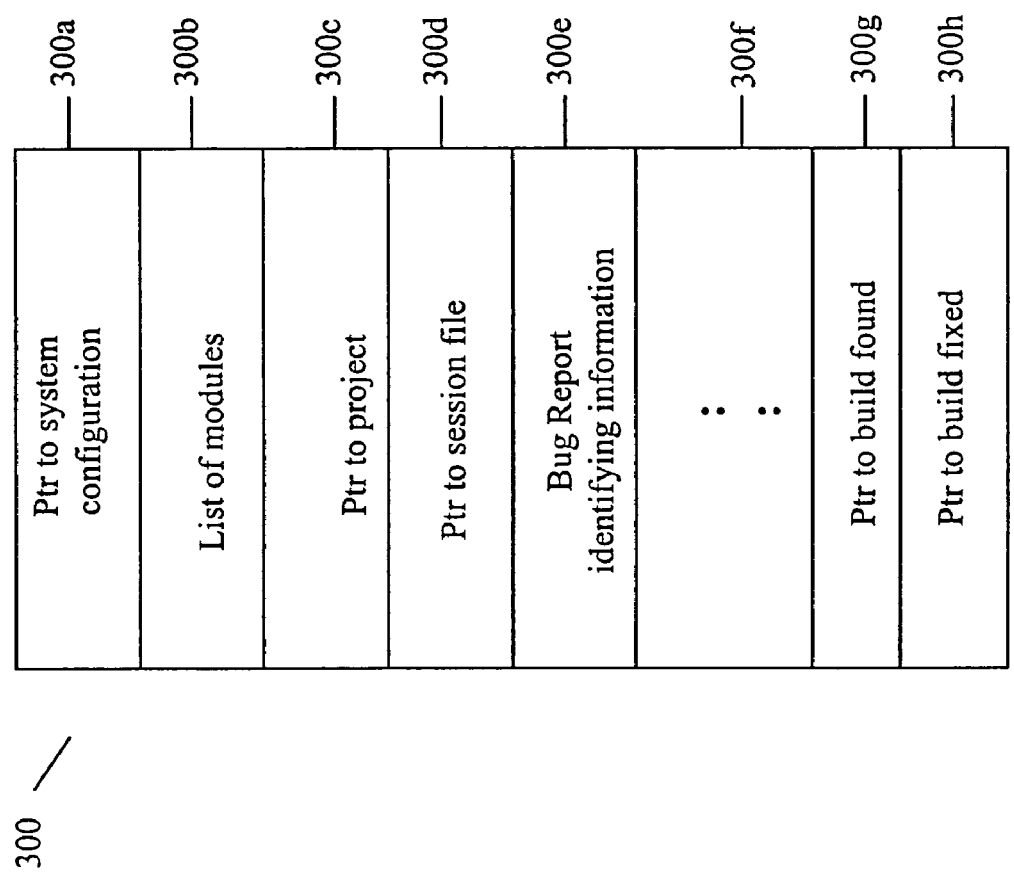
FIG. 8C is an example of an embodiment of a bug report object that may be included in the representation of the database schema.

Referring to FIG. 8C, shown is an example of an embodiment of a bug report object that may be included in the previously described representation of the database schema 71. The bug report object 300 in this embodiment includes a pointer to a system configuration object 300a, a list of modules 300b, a pointer to a project object 300c, a pointer to a session file 300d, bug report identifying information 300e, a pointer to a build object describing a build in which this bug may be found 300g, a pointer to another build object describing another build in which this bug is identified as being corrected 300h, and other bug report data 300f. This object may be created, for example, in conjunction with a bug report submitted to the e-mail reader tool 62, and included in the database. It should be noted that the fields 300a-300c refer to objects previously described. Data associated with this object may be retrieved and used, for example, as will be described in paragraphs that follow, when querying the database regarding a version of a software module associated with a bug report. The pointer to a session file 300d identifies a corresponding data file related to the bug report, for example, a data file related to test coverage data as may be generated by a testing tool such as NuMega TrueTime or NuMega TrueCoverage. The bug report identifying information 300e may be one or more fields of data identifying the reported bug. For example, this information 300e may include data such as a priority, who entered the bug report, the date of bug report submission, a description of the problem, product information associated with the reported bug, and the like. It should be noted that, as with other data representations described herein, the fields included may vary in accordance with each implementation.

The information included in field 300g, identifying a build in which this bug may be found, may be determined, for example, when the e-mail reader tool 62 receives a bug report and associated information identifying a build. Machine executable code, as may be associated with the e-mail reader tool 62, may be executed to determine a matching build included in the database in accordance with the build identified in the bug report. Similarly, when a build includes modules, such as source code changes recompiled and relinked, to correct this bug report, machine executable code, such as may be included in a viewer/query tool, may be used to enter the information included in field 300h pointing to a build object.

Figure 8D:
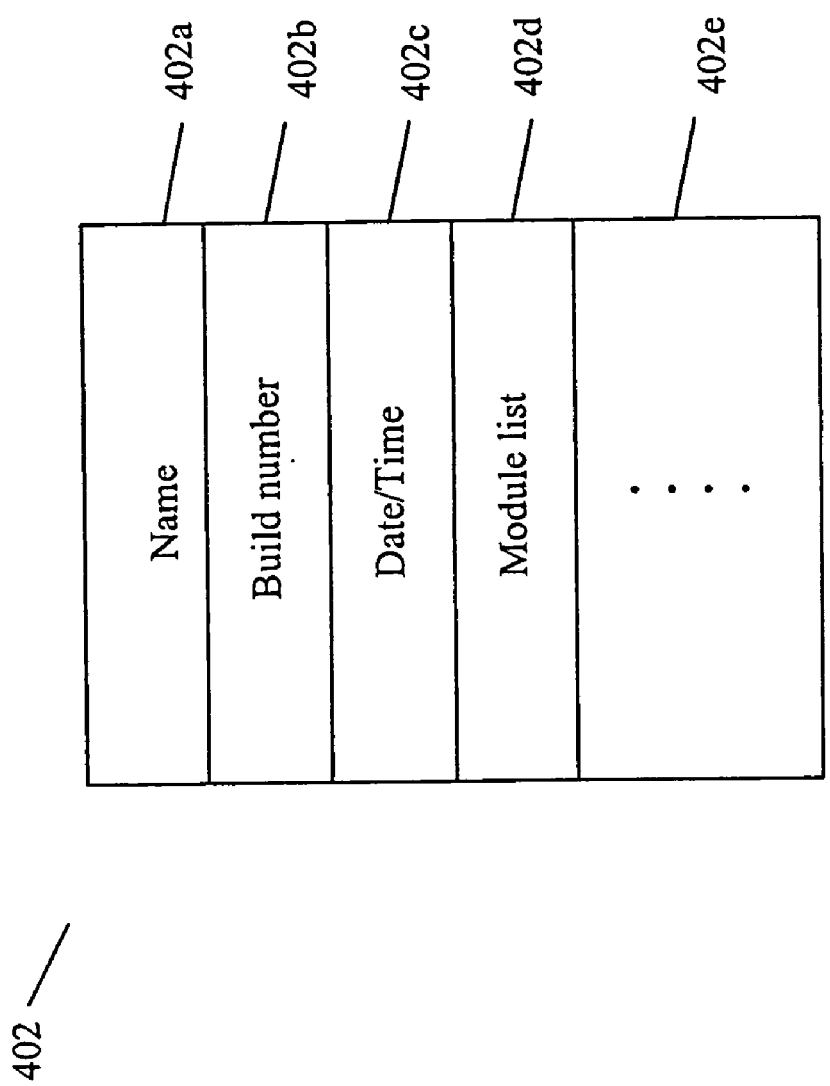
FIG. 8D is an example of an embodiment of the build object that may be included in the representation of the database schema.

Referring now to FIG. 8D, shown is an example of an embodiment of the build module object. The build module object 402 included in FIG. 8D may be an embodiment, for example, of the build objects 402 and 406 as previously described in conjunction with the database schema 71 of FIG. 5. In this particular embodiment, the build object 402 includes a name field 402a, a build number field 402b, a date and time field 402c, a module list 402d and additional information field 402e. The name field 402a may include an alphanumeric or other name identifying the build being described. The build number 402b may be a numeric quantity, for example, represented as a numeric field with a decimal point, such as "4.2" indicating a primary and a secondary version number of a particular build to enable identification of a build. The date and time 402c may be a date and time stamp format that identifies the time at which an associated build is created. The module list 402d includes pointers or references to one or more module objects, such as module objects 410, 412 and the like included in the database schema 71 of the previously described FIG. 5. The additional information field 402e may include other information as needed in accordance with each implementation and embodiment.

A build object, such as the embodiment 402 described in conjunction with FIG. 8D, may be created as part of a build registration process, for example, as may be performed by the build registration tool 61 of FIG. 4. During the build registration process, the build object and associated module objects may be created and stored in the database 22. As known to those skilled in the art of software development, a build may be performed every night or at other reasonable increments during the software development process. A new build may be registered, for example, when a "nightly" build, is performed. At this time, a build object and associated objects, such as module objects, may be created and included in the database 22.

Figure 9:
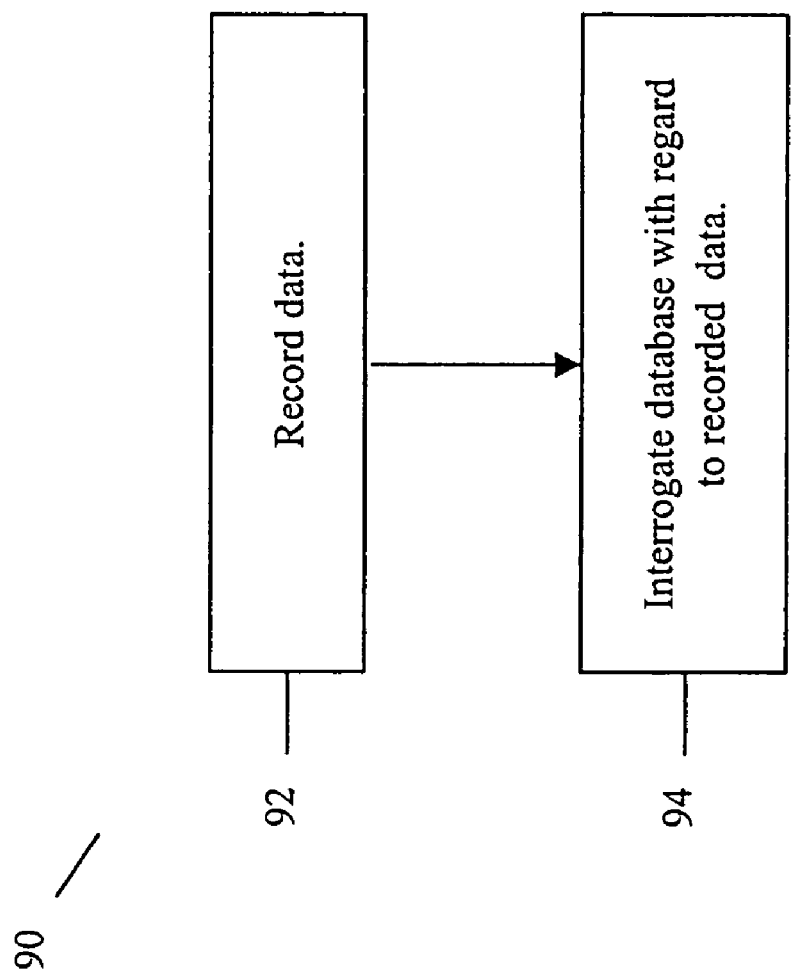
FIG. 9 is a flowchart of an example of an embodiment of how build data is recorded and used.

Referring to FIG. 9, shown is a flow chart of an example of an embodiment of the steps of how software and hardware component and environment information may be stored and used within the system 10. At step 92, data is recorded. This data may include, for example, build registration information as well as testing session or execution run time information. This will be described in more detail in paragraphs that follow in conjunction with other figures. At step 94, the database, such as the database 22, may be interrogated with regard to the data that was recorded in the previous step 92.

Figure 10:
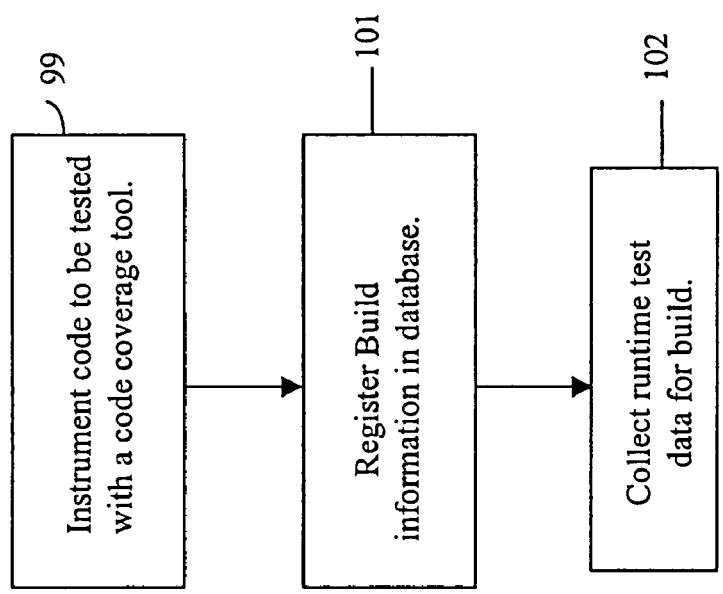
FIG. 10 is a flowchart of an example of embodiment of a method of how data is gathered for one or more builds.

Referring to FIG. 10, shown are more detailed steps of one embodiment for recording data. At step 99, the code to be tested may be instrumented to provide code coverage information, for example, as using NuMega TrueCoverage. For example, as a result of performing step 99, a function signature table may be produced in which the table includes data describing various aspects of the function such as number and type of parameters. This data may be represented as a checksum value associated with each function. It should be noted that this step is optional and other embodiments may include other processing steps in accordance with the type of data being included and represented in the database schema.

At step 101, build information may be registered in the database 22, for example, using the build registration tool 61 previously described. Also as previously described, created within the database in accordance with the previously described database schema 71, are various build objects and module objects associated with the build being registered. For example, the information included in a module object may be the function signature table produced, for example, in step 99. Subsequently, at step 102, run time test data is collected in accordance with a particular build. This run time test data may be gathered using the techniques previously described in conjunction with the monitor process 30 as shown in FIGS. 2 and 3 and recorded as software module information using these automated techniques previously described herein. Subsequently, the monitor process may also include machine executable code which attempts to match the information collected automatically at run time to a particular build, for example, as may be previously entered with a build registration tool and stored in the database. Both the run time test data as well as the build matching information for a particular test system execution determined in conjunction with step 102 may be stored and collected in the database. It should be noted that more detailed steps associated with steps 101 and 102 of flowchart 92 are described in more detail in paragraphs that follow.

Figure 11:
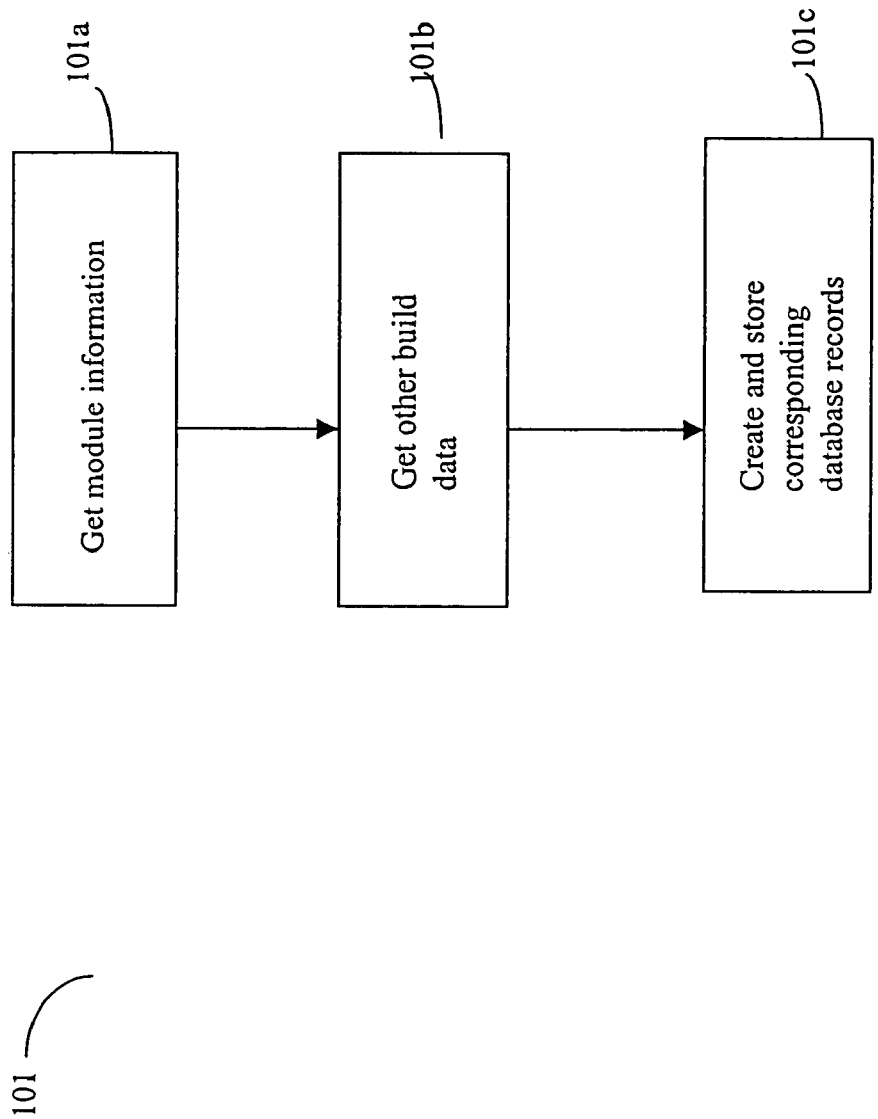
FIG. 11 is a flowchart of an example of steps of a method for registering build data.

Referring now to FIG. 11, shown is a flowchart including steps from one embodiment for registering build information. As part of the build registration process, module information is gathered as in step 101a. This may include, for example, information associated with the module objects. At step 101b, additional build data may be obtained. This may be used, for example, in determining the data content of other fields associated with the build object previously described. At step 101c, the data gathered from the previous steps may be stored in the database in the appropriate objects created.

Figure 12:
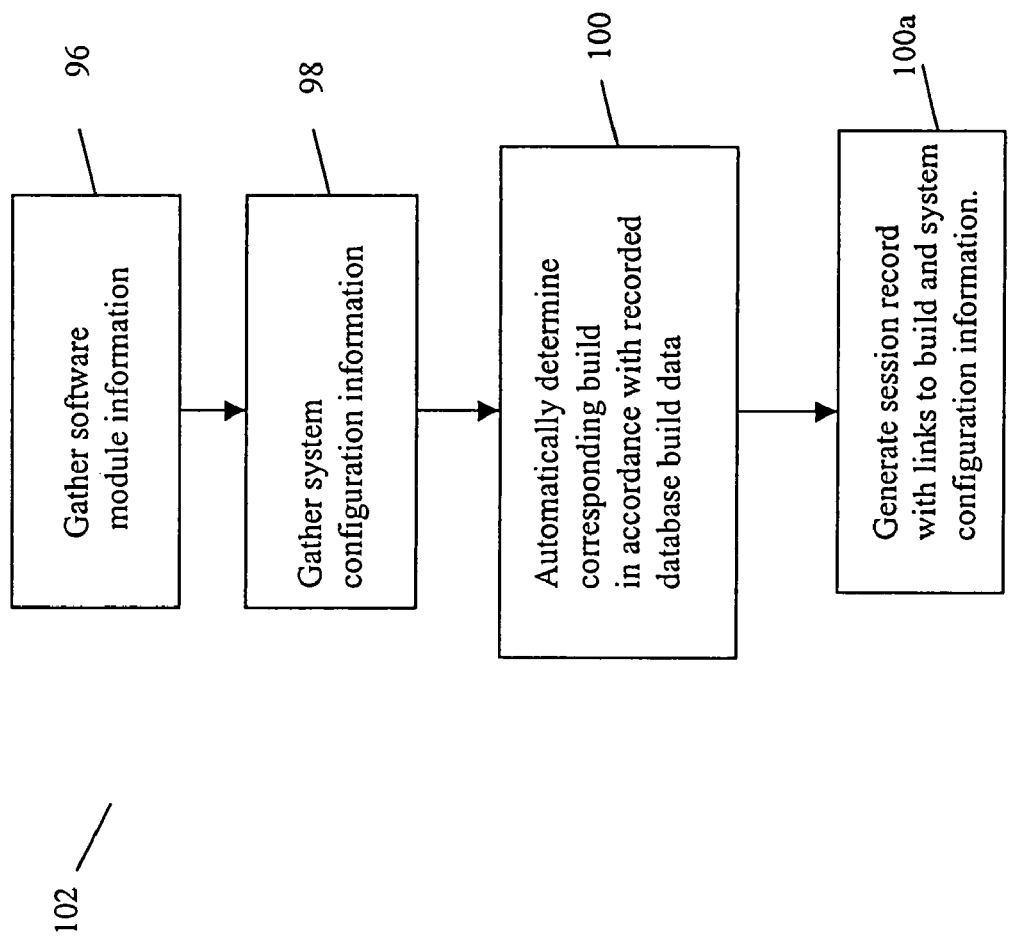
FIG. 12 is a flowchart of an example of steps of a method for recording test information for a corresponding build being tested.

Referring to FIG. 12, shown are more detailed steps of one embodiment for collecting run time test data that may be associated with a build. At step 96, software module information is gathered. In this particular embodiment, software module information may be stored in accordance with the previously described database representation 71 using the module object such as 74. Additionally, as part of this process, information about the software modules is gathered for subsequent use in the determination of a corresponding build. In this particular embodiment, each of the software modules represented by a module object corresponds to a library such as a DLL or an OCX that includes shared code. The type of information gathered for a module object uniquely identifies a particular version of each of these libraries. It should also be noted that gathering software information may be obtained using the foregoing data gathering techniques in conjunction with the previously described monitor process. Additionally, software information may also be gathered using alternative techniques, such as operating system calls that return software information.

At step 98, system configuration information is gathered. It should be noted that in this particular embodiment, system configuration information includes data as represented and stored in the system configuration object in accordance with data representation of data schema 71. The system configuration information generally includes data that uniquely identifies a particular system configuration. For example, the system configuration information gathered in step 98 may include a portion of the information corresponding to Windows registry settings.

The system configuration information may be gathered using a variety of different techniques in accordance with each particular embodiment. In one embodiment, system configuration information, such as operating system version and number as well as the type of processors, may be obtained by performing operating system calls. Specific routine calls or APIs, as well as their availability, may vary in accordance with each of the systems as well as the techniques provided to obtain system configuration information.

At step 100, a current build is determined in accordance with the software module information gathered at step 96. A corresponding previously registered build is automatically determined at step 100 that matches the current build. In other words, a matching build may be automatically selected from the information stored in the database 22 in which the software module information gathered at step 96 corresponds to other software module information associated with a previously registered build. One technique for determining a matching build will be described in paragraphs that follow.

At step 100a, corresponding build data as well as test execution data is updated in the database. For example, in the previously described session object, a field included in the session object may be updated as identifying one or more builds being tested in this execution.

In one embodiment, as a result of step 100, returned from the database is a pointer to a particular build object. As a result of step 100a, a session object such as object 72 described in conjunction with FIG. 8b, may have its field 72i point to the build identified in step 100.

Referring back to FIG. 9, the database may be interrogated with regard to data that is recorded. For example, it may be determined what build stored in the database matches a particular set of software modules in accordance with a user selected build. Additionally, information stored in the database for multiple selected builds may be used to perform several evaluations or determinations. For example, as previously described, volatility regarding code changes may be determined between builds. A user may be prompted to select one or more builds, for example, from a list of previously registered builds. If two builds are selected from a particular list, a database query may be performed to locate these two builds as identified within the database 22.

Various calculations may be performed using the information stored in the database with regard to the software modules, for example, to determine code volatility between builds. Additionally, other information may be used from more than one build to determine other statistics. For example, a summary of all of the builds associated with a particular project may be desired. The database may also be queried for identifying a certain number of builds in accordance with a particular date range, such as all of the builds between a particular code freeze date and the current date. As known to those skilled in the art, these and other uses of the information stored in the database 22 may be used to perform an evaluation of various aspects of this software and/or hardware and associated information recorded in the database.

Figure 13:
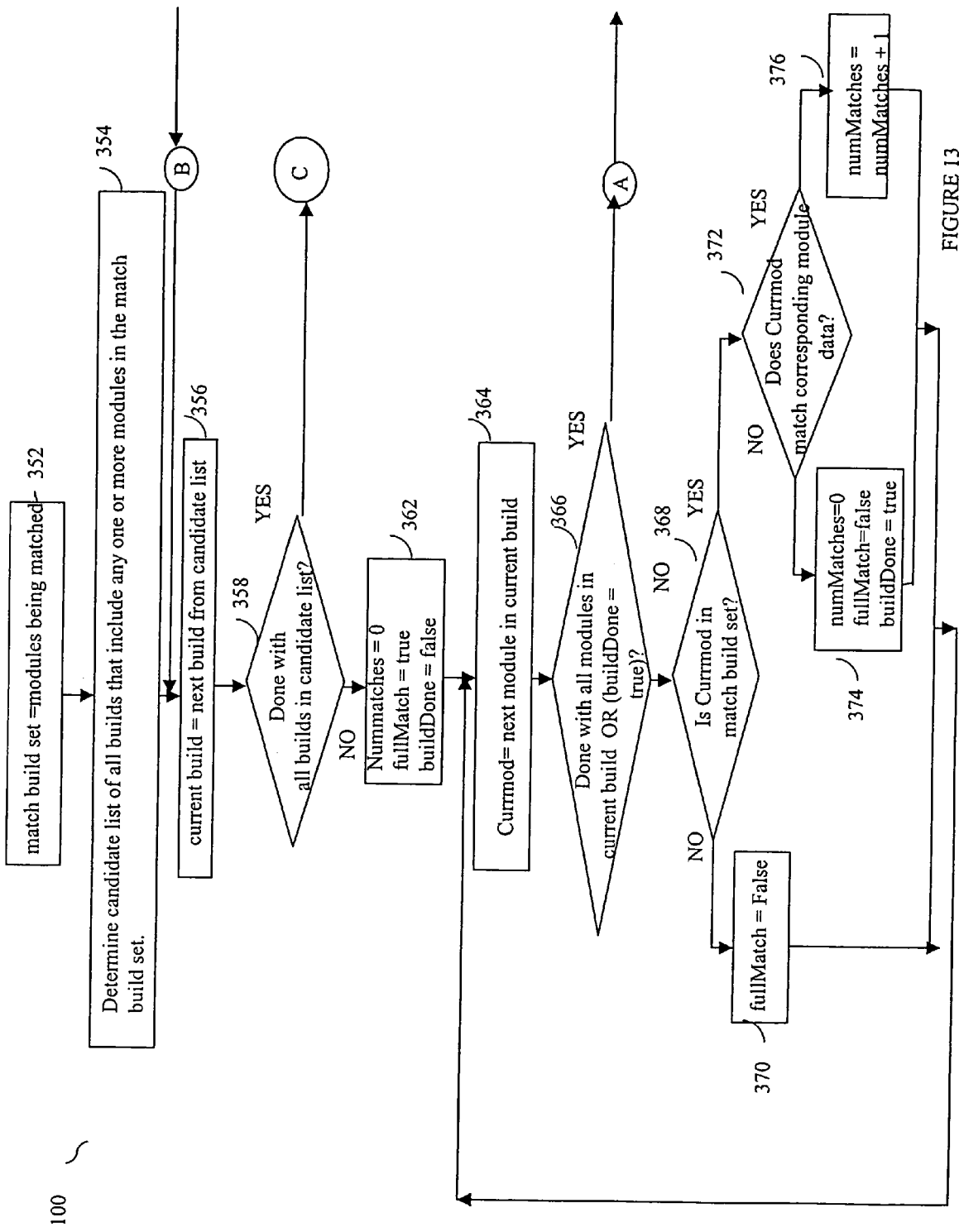
FIGS. 13-15 are flowcharts of steps of a method in an embodiment of determining a matching build from data recorded in a database.
Figure 14:
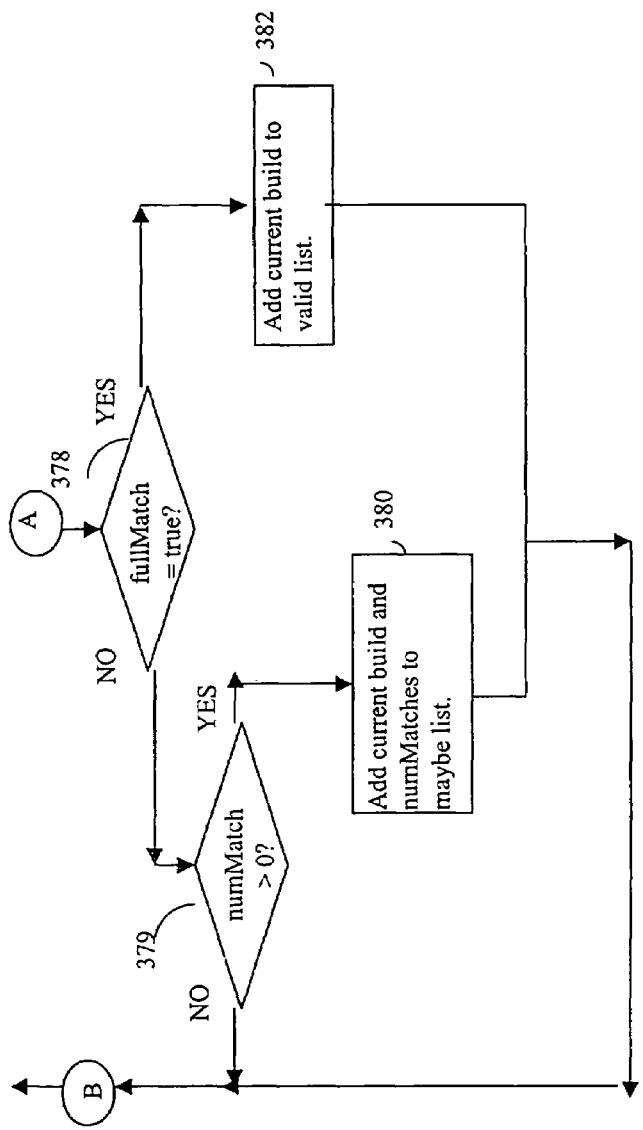
Figure 15:
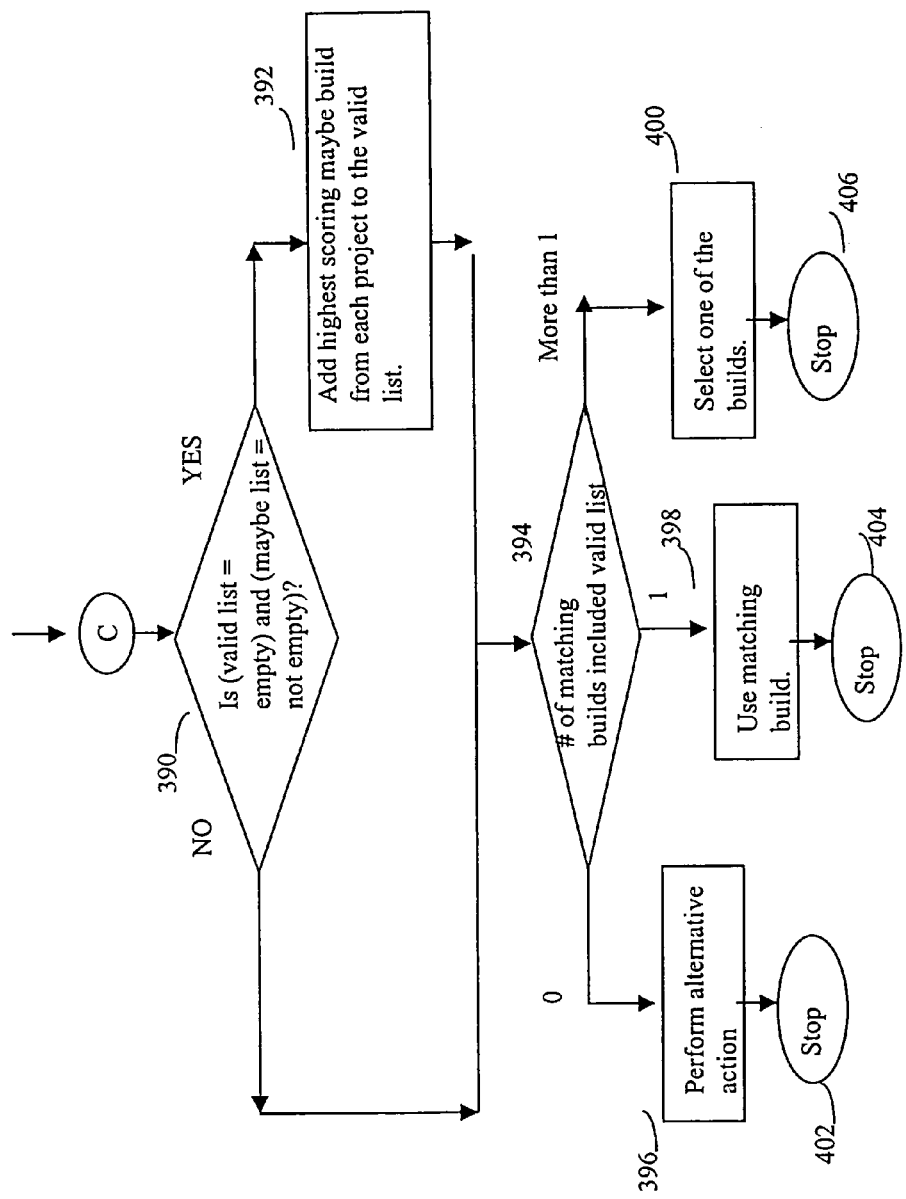

Referring to FIGS. 13 through 15, shown are flowcharts of steps of an embodiment of a method for determining a matching build in accordance with predetermined criteria. Referring to FIG. 13, flowchart 100 at step 352 defines match build set as the set of modules being located or determined in accordance with information stored in the database. At step 354, a candidate list of all the builds that include any one or more of the modules identified in match build set is determined. The candidate list of step 354 may be determined, for example, by performing a union of all of the builds that include any one of the modules identified in the match build set defined at step 352. At step 356, current build is assigned the first build from the candidate list. At step 358, a determination is made as to whether all of the builds in the candidate list have been processed. If a determination is made at step 358 that all of the candidates have been processed, control proceeds to processing point C of FIG. 15. If a determination is made that there are additional candidates included in the build candidate list, control proceeds to step 362 where variables are initialized for processing the current build candidate. At step 362, the variable Nummatches is assigned a value of zero, fullMatch is set to TRUE, and buildDone is set to FALSE. It should be noted that these variables are used in subsequent processing steps and other embodiments may include other variables as well as use other techniques known to those skilled in the art to implement the logic included and described in the flowcharts described herein.

Control proceeds to step 364 where a variable currmod is assigned the first module in the current build list. At step 366, a determination is made as to whether all of the modules in the current build have been processed, or if the variable buildDone is TRUE. If a determination is made that all of the modules in the current build have been processed, or the boolean variable builddone is TRUE, control proceeds from step 366 to the processing indicated in FIG. 14 at Point A.

At point A in FIG. 14, control proceeds to step 378 where a determination is made as to whether the variable fullMatch is TRUE. If fullMatch is TRUE, control proceeds to step 382 where the current build is added to valid list. At this point, valid list includes those builds that have been determined to be a full or complete match for the build associated with match build set. In this embodiment, a complete or full match is determined when module names and attributes match. If a determination is made at step 378 that fullMatch is not TRUE, control proceeds to step 379. At step 379, a determination is made as to whether numMatches is greater than zero. If a determination is made at step 379 that the number of matches (numMatches) is greater than zero, meaning that there has been at least one module which has been an exact match, control proceeds to step 380 where the current build and the corresponding number of matches is added to the maybe list.

In this particular embodiment, maybe list identifies those builds which are close matches but not exact or full build matches. Thus, the variable numMatches indicates a score of the number of matches for modules included in a build identified in the maybe list for which there has been a complete match.

Subsequent to performing steps 380 and 382, control proceeds to Point B from FIG. 14 back to FIG. 13 at step 356. At step 356, the next build from the candidate list is examined and assigned to the variable current build. Control then proceeds to step 358 where the test is once again performed to see whether all of the builds and the candidate list have been examined.

If at step 366 a determination is made that all modules in the current build have not been processed, and that buildDone is not TRUE, control proceeds to step 368. At step 368, a determination is made as to whether the current module (currmod) of the current build is included in the module set associated with a build for which the search is being performed (as identified by "match build set"). If the current module is included in "match build set", control proceeds to step 372. At step 372, a determination is made as to whether the attributes and other data associated with each of the modules also match. If so, control proceeds to step 376 where the number of matches (numMatches) is increased by one indicating that there has been another full matching module detected. Otherwise, if the attributes do not match, from step 372, control proceeds to step 374. At step 374, numMatches is assigned zero, fullMatch is set to FALSE, and buildDone is set to TRUE. In other words, if a module is included but not an exact match, in this embodiment, it is determined that this cannot be a valid or matching build.

It should be noted that in this embodiment, the variable buildDone is set to TRUE as a boolean "short circuit" to performing the processing steps of the loop starting at step 364. In other words, when the current module being examined from any build does not match both the name and attributes of a particular module in the match build set, there is no need to examine the remainder of the modules included in the build. Setting the variable buildDone to TRUE at step 374 provides a "short cut" exit from the process of examining all the modules.

If a determination is made at step 368 that the current module (currmod) is not included in "match build set", control proceeds to step 370 where the variable fullMatch is set to FALSE.

Subsequent to performing the processing of steps 374, 376 and 370, control proceeds to step 364 to the top of the loop to begin processing the next module in the current build. The processing formed by the loop beginning at step 364 is performed for every module in the current build in which the current build is the current build being examined with regard to the match build set.

Referring to FIG. 15, shown is a flowchart of an embodiment of the method steps that may be performed subsequent to processing all of the build candidates included in the candidate list as processed by the flowchart of FIGS. 13 and 14. Upon completion of the flowchart, 100 of FIGS. 13 and 14, two lists of builds or build candidates are determined. In this particular embodiment, the candidate list has been processed. Each build candidate included in the list has either been included in the valid list, the maybe build list, or not included in either list. A build candidate included in the valid list is an exact match in name and attributes for every module in the build. A build candidate included in the maybe build list has some modules that match in name and attributes, while others in the build are not included in the match module set. A build candidate may be omitted from the valid list as well as the maybe list if there is a module that matches in name, but no match in terms of associated attributes. It should be noted that other embodiments may include other techniques for determining a close but not exact match for a module.

Referring to FIG. 15, at step 390, a determination is made as to whether the valid list is empty and the maybe list is not empty. If a determination is made at step 390 that the valid list is empty and the maybe list contains one or more entries, control proceeds to step 392 where the highest scoring maybe build associated with each project is added to the valid list.

At step 394, a determination is made as to the number of matching builds included in the valid list. Processing is performed with regard to classifying the number of matching builds in the valid list into one of three categories. If there are no matching builds included in the valid list at this point, an alternative action is performed at step 396, such as prompt the user to register the build. If one matching build is included in the valid list, control proceeds to step 398 where the one matching builds included in the current valid list is used as a matching build. Control proceeds to step 404 where processing stops. If a determination is made that the number of matching builds included in the valid list at this point is more than one, control proceeds to step 400 where the user is prompted to select one of these builds as the matching build to be used.

The previously described steps for a matching build performed in conjunction with FIGS. 13 through 15 may be used, for example, in the previously described technique of determining a matching build when a test execution is performed of a software system. Similarly, when a bug report is entered into the system as via the e-mail reader tool, a build is determined which matches the build information submitted in accordance with the e-mail bug report. However, it should be noted that in any of these processes in which user interaction is required, as in the case where multiple matches are found, an alternative technique may be used to select one of the builds rather than require user intervention if total automation is desired, as in the case for example where a process might run in batch mode.

Figure 16:
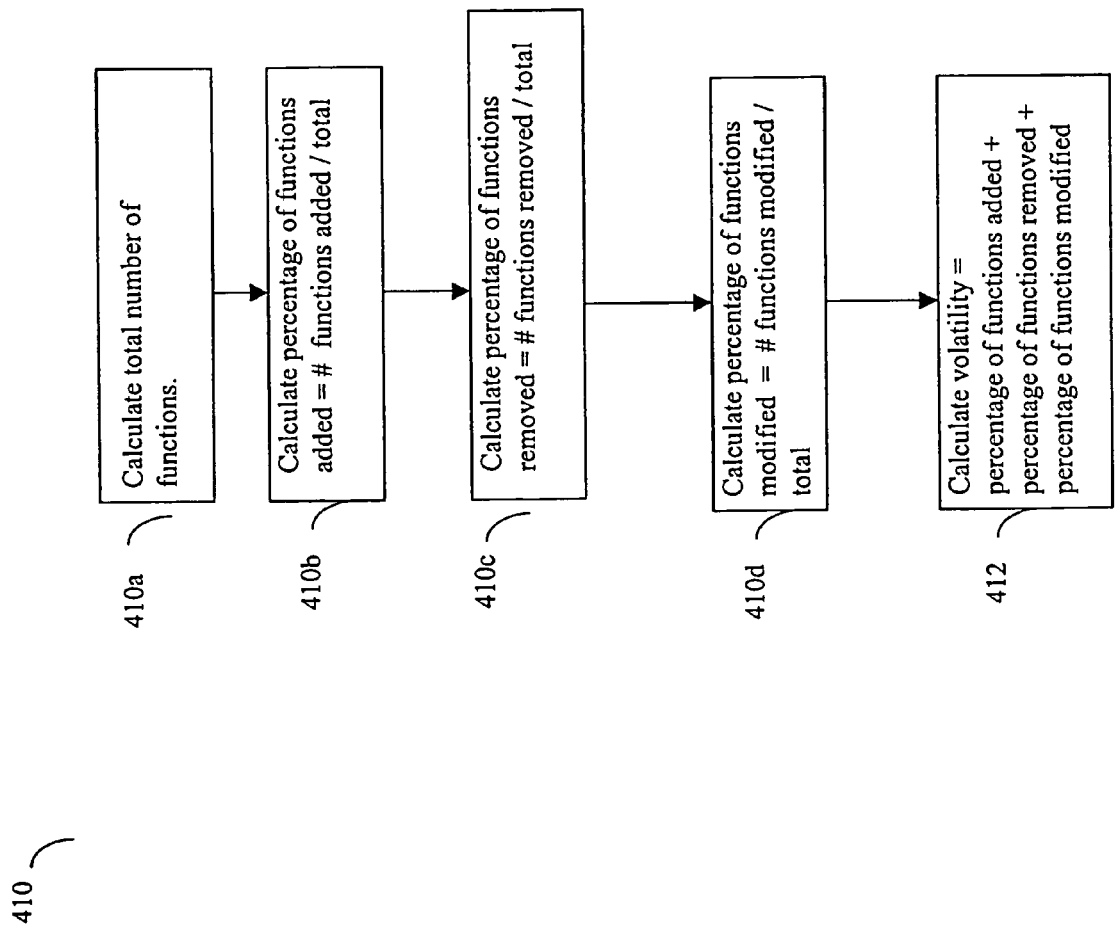
FIG. 16 is a flowchart of steps of a method for determining the volatility between two builds.

It should also be noted that the foregoing technique used to determine a matching build may be performed, for example, to automatically associate a session or bug with a build. What will now described in paragraphs that follow associated with FIG. 16 is a process by which code volatility between builds may be determined. It should be noted that other embodiments may determine code volatility using other techniques or in conjunction with other metrics.

Referring to FIG. 16, shown is a flowchart of the steps of a method for determining the volatility between two builds that have been selected. The flowchart 410 includes at step 410a calculating the total number of functions. A total number of functions, for example, may be determined by information associated with each of the modules in the database. This information may be stored as a separate field or attribute for example of each of the module objects. This as well as other information and data that may be used in determining the following metrics may be obtained by performing database queries and using the foregoing database schema.

At step 410b, the percentage of functions added is determined. This is determined as the ratio of the number of functions added over the total number of functions calculated at step 410a. At step 410c, the percentage of the number of functions removed is calculated. This is determined by performing a ratio of the number of functions removed over the number of functions determined at step 410a. At step 410d, the percentage of functions modified is determined. This is determined as a ratio of the number of functions modified over the total number of functions as determined in step 410a. At step 412, the volatility metric is calculated as the sum of the number of the functions added, the number of functions removed, and the number of functions modified. It should be noted that in one embodiment, when a particular module or library is added, every function included in that library as associated with the module is added. Similarly, whenever a library or module is removed, every function included in that module is considered as being removed when performing the foregoing calculations with regard to steps 410b, 410c, and 410d. If the body of a function or DLL changes but not the signature, this is counted as a modified function. It should be noted that this function information may be associated with a module object, for example, in the form of the function signature table that includes checksum information representing various function attributes as may be determined, for example, in accordance with the machine code associated with the function. For a function, if the associated signature has changed, this implies that the function with an old name was removed and, a function with a new name added. Differences in checksum values may be used in determining the volatility in accordance with signature differences for the same function in two different builds including the same module.

It should be noted that in this particular embodiment, the granularity for determining volatility is at the function level in which the function information is represented and stored in an efficient form, such as the signature table previously described and associated with each module. Other embodiments may include and store different information in different forms in accordance with each embodiment. Additionally, the granularity of other embodiments may also vary.

It should also be noted that the processing of step 94 in the previously described flowchart 90 of FIG. 9 included the step of interrogating the database with regard to the recorded data. The foregoing description of performing a build match as well as the volatility between builds and performing certain queries with regard to the data stored such as printing out or displaying all of the builds of a particular project or between particular date ranges may be performed in accordance with the processing denoted by step 94 of FIG. 9.

The number of the foregoing methods and techniques that may be included in an embodiment vary with each implementation. They may be included and used in various combinations to perform different assessments with regard to the database.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for automatically tracking build information to determine a volatility metric between a first build of a first version of software and a second build of a second version of software, comprising:

extracting the second build by processing, for the second version of the software, one or more software modules produced using a compilation process resulting in said one or more software modules of the second version of software, wherein said second build includes at least one of: a name field, a build number, a date and time identifier, a number of functions and modification information for the functions being associated with at least one software module as a result from said compilation process;

following extracting the second build, registering said second build by storing said second build corresponding to said second version of software in a database;

executing said second version of software;

automatically determining runtime data during execution of said second version of the software, wherein the runtime data corresponds to information extracted and registered for the second version of the software;

performing a query of the database to retrieve the second build based on the runtime data and to retrieve the first build; and after performing the query of the database to retrieve the first build and the second build, determining a volatility metric of code change that has occurred between the first and second versions of the software, wherein determining the volatility metric includes matching portions of the first build to corresponding portions of said second build and determining at least one of: a date and time difference, a build number difference, a number of functions added, a number of functions removed and a number of functions modified in a software module of the second version of the software in comparison to a software module of the first version of the software.

2. The method of claim 1, wherein said database that includes said build information is an object database, and the method further comprises:

creating and storing one or more objects corresponding to each of said builds; and creating and storing one or more objects corresponding to software modules included in each of the builds.

3. The method of claim 2, further including:

creating and storing a session object corresponding to a test session of said software;

creating and storing one or more objects corresponding to software modules describing said software module information;

automatically determining a previously created build object corresponding to one of said one or more builds previously registered; and storing an address of said previously created build object in said session object.

4. The method of claim 1, wherein subroutine calls associated with an operating system executing in said computer system are used in said gathering runtime information.

5. The method of claim 1, further comprising:

creating and storing a bug report object corresponding to a bug report, said bug report object including an address associated with said second build.

6. The method of claim 5, further including:

submitting said bug report included in a formatted electronic message;

interpreting data included in said formatted electronic message to enable said determining of said second build.

7. The method of claim 6, further including:

creating and storing another build object corresponding to a build in which said bug report is identified as being corrected; and associating said other build object with said bug report object in said database.

8. The method of claim 1, wherein said automatically determining said runtime data further comprises:

determining said second build for which a matching build is being determined from said one or more builds registered;

determining a candidate list including one or more builds having at least one software module in common with said second build;

for each build included in said candidate list, determining if software modules included in said each build match software modules included in said second build;

for each build included in said candidate list, if there are no software modules included in said each build that have a module name and associated attributes matching a software module included in said second build, determining that said each build is not a match for said second build; and for each build included in said candidate list, if a first of said software modules included in said each build has a module name that matches a software module included in said second build but attributes associated with said software module do not match said software module included in said second build, determining that said each build is not a match for said second build.

9. The method of claim 8, further including:

for each build included in said candidate list, determining a number of matches for software modules included in said each build having a matching module name and attributes of a software module included in said second build;

determining a valid list of one or more matching builds, each of said builds included in said valid list having a full match for software modules included in said each build with software modules included in said second build, each software module included in said each build having a corresponding matching software module included in said second build, said name and associated attributes of said each software module matching said matching software module included in said second build; and determining a maybe list of one or more builds, each of said one or more builds included in said maybe list having at least one software module having a module name that does not have a matching software module included in said second build, said each build including at least one software module having a module name and associated attributes matching another software module included in said second build, wherein said each build has an associated number of matches.

10. The method of claim 9, further including:

if said valid list is empty, for each project, adding a build from said maybe list to said valid list in which the build added has a maximum number of matches of builds associated with said each project, a project having one or more associated builds;

performing an alternative action if said valid list is empty;

if there is only one build included in said valid list, determining that said one build matches said second build; and if there is more than one build included in said valid list, selecting one of the more than one builds included in said valid list as being the build matching said second build.

11. The method of claim 10, further including:

selecting one or more build associated with a software project.

12. The method of claim 10, further including:

determining a matching build in accordance with a predetermined build selected from a list of more than one build previously registered.

13. A computer readable medium comprising machine executable code stored thereon for automatically tracking build information to determine a volatility metric between a first build of a first version of software and a second build of a second version of software, the computer readable medium comprising:

machine executable code for extracting the second build by processing, for the second version of the software, one or more software modules produced using a compilation process resulting in said one or more software modules of the second version of software, wherein said second build includes at least one of: a name field, a build number, a date and time identifier, a number of functions and modification information for the functions being associated with at least one software module as a result from said compilation process;

machine executable code for registering said second build following extracting the second build by storing said second build corresponding to said second version of software in a database;

machine executable code for automatically determining runtime data during execution of said second version of the software, wherein the runtime data corresponds to information extracted and registered for the second version of the software;

machine executable code for performing a query of the database to retrieve the second build based on the runtime data and to retrieve the first build; and machine executable code for determining a volatility metric of code change that has occurred between the first and second versions of the software after performing the query of the database to retrieve the first build and the second build, wherein determining the volatility metric includes matching portions of the first build to corresponding portions of said second build and determining at least one of: a date and time difference, a build number difference, a number of functions added, a number of functions removed and a number of functions modified in a software module of the second version of the software in comparison to a software module of the first version of the software.

14. The computer readable medium of claim 13, wherein said database that includes said build information is an object database, and the computer program product further comprises:

machine executable code for creating and storing one or more objects corresponding to each of said builds; and machine executable code for creating and storing one or more objects corresponding to software modules included in each of the builds.

15. The computer readable medium of claim 14, further including:

machine executable code for creating and storing a session object corresponding to a test session of said software;

machine executable code for creating and storing one or more objects corresponding to software modules describing said software module information;

machine executable code for determining automatically a previously created build object corresponding to one of said one or more builds previously registered; and machine executable code for storing an address of said previously created build object in said session object.

16. The computer readable medium of claim 13, wherein machine executable code associated with an operating system is used in gathering runtime information.

17. The computer readable medium of claim 13, further including:

machine executable code for creating and storing a bug report object corresponding to a bug report, said bug report object including an address associated with said second build.

18. The computer readable medium of claim 17, further including:

machine executable code for submitting a bug report included in a formatted electronic message; and machine executable code for interpreting data included in said formatted electronic message to enable determination of said second build.

19. The computer readable medium of claim 18, further including:

machine executable code for creating and storing another build object corresponding to a build in which said bug report is identified as being corrected; and machine executable code for associating said other build object with said bug report object in said database.

20. The computer readable medium of claim 13, wherein said machine executable code for automatically determining said runtime data further comprises:

machine executable code for determining said second build for which a matching build is being determined from said one or more builds registered;

machine executable code for determining a candidate list including one or more builds having at least one software module in common with said second build;

machine executable code for determining, for each build included in said candidate list, if software modules included in said each build match software modules included in said second build;

machine executable code for determining, for each build included in said candidate list, if there are no software modules included in said each build that have a module name and associated attributes matching a software module included in said second build, determining that said each build is not a match for said second build; and machine executable code for determining, for each build included in said candidate list, that said each build is not a match for said second build if a first of said software modules included in said each build has a module name that matches a software module included in said second build but attributes associated with said software module do not match said software module included in said second build.

21. The computer readable medium of claim 13, further including:

machine executable code for determining, for each build included in said candidate list, a number of matches for software modules included in said each build having a matching module name and attributes of a software module included in said second build;

machine executable code for determining a valid list of one or more matching builds, each of said builds included in said valid list having a full match for software modules included in said each build with software modules included in said second build, each software module included in said each build having a corresponding matching software module included in said second build, said name and associated attributes of said each software module matching said matching software module included in said second build; and machine executable code for determining a maybe list of one or more builds, each of said one or more builds included in said maybe list having at least one software module having a module name that does not have a matching software module included in said second build, said each build including at least one software module having a module name and associated attributes matching another software module included in said second build, wherein said each build has an associated number of matches.

22. The computer readable medium of claim 21, further including:

machine executable code for adding, if said valid list is empty, for each project, a build from said maybe list to said valid list in which the build added has a maximum number of matches of builds associated with said each project, a project having one or more associated builds;

machine executable code for performing an alternative action if said valid list is empty;

machine executable code for determining that said one build matches said second build if there is only one build included in said valid list; and machine executable code for selecting one of the more than one builds included in said valid list as being the build matching said second build if there is more than one build included in said valid list.

23. The computer readable medium of claim 22, further including:

machine executable code for selecting one or more build associated with a software project.

24. The computer readable medium of claim 22, further including:

machine executable code for determining a matching build in accordance with a predetermined build selected from a list of more than one build previously registered.

* * * * *